United States Patent [19]

Joyce et al.

[11] 4,214,303

[45] Jul. 22, 1980

[54] WORD ORIENTED HIGH SPEED BUFFER MEMORY SYSTEM CONNECTED TO A SYSTEM BUS

[75] Inventors: Thomas F. Joyce, Burlington; Thomas O. Holtey, Newton Lower Falls; William Panepinto, Jr., Tewksbury, all of Mass.

[73] Assignee: Honeywell Information Systems Inc., Waltham, Mass.

[21] Appl. No.: 863,093

[22] Filed: Dec. 22, 1977

[51] Int. Cl.² ............................................. G06F 13/00
[52] U.S. Cl. ....................................................... 364/200
[58] Field of Search ... 364/200 MS File, 900 MS File

[56] References Cited

U.S. PATENT DOCUMENTS

| | | | |
|---|---|---|---|
| 3,820,078 | 6/1974 | Curley et al. | 364/200 |
| 3,840,862 | 10/1974 | Ready | 364/200 |
| 3,840,863 | 10/1974 | Fuqua et al. | 364/200 |
| 3,866,183 | 2/1975 | Lange | 364/200 |
| 4,068,299 | 1/1978 | Bachman | 364/200 |

*Primary Examiner*—Melvin B. Chapnick
*Attorney, Agent, or Firm*—George Grayson; Nicholas Prasinos; Ronald T. Reiling

[57] ABSTRACT

A word oriented data processing system includes a plurality of system units all connected in common to a system bus. Included are a central processor unit (CPU), a memory system and a high speed buffer or cache system. The cache system is also coupled to the CPU. The cache includes an address directory and a data store with each address location of directory addressing its respective word in data store. The CPU requests a word of cache by sending a memory request to cache which includes a memory address location. If the requested word is stored in the data store, then it is sent to the CPU. If the word is not stored in cache, the cache requests the word of memory. When the cache receives the word from memory, the word is sent to the CPU and also stored in the data store.

11 Claims, 28 Drawing Figures

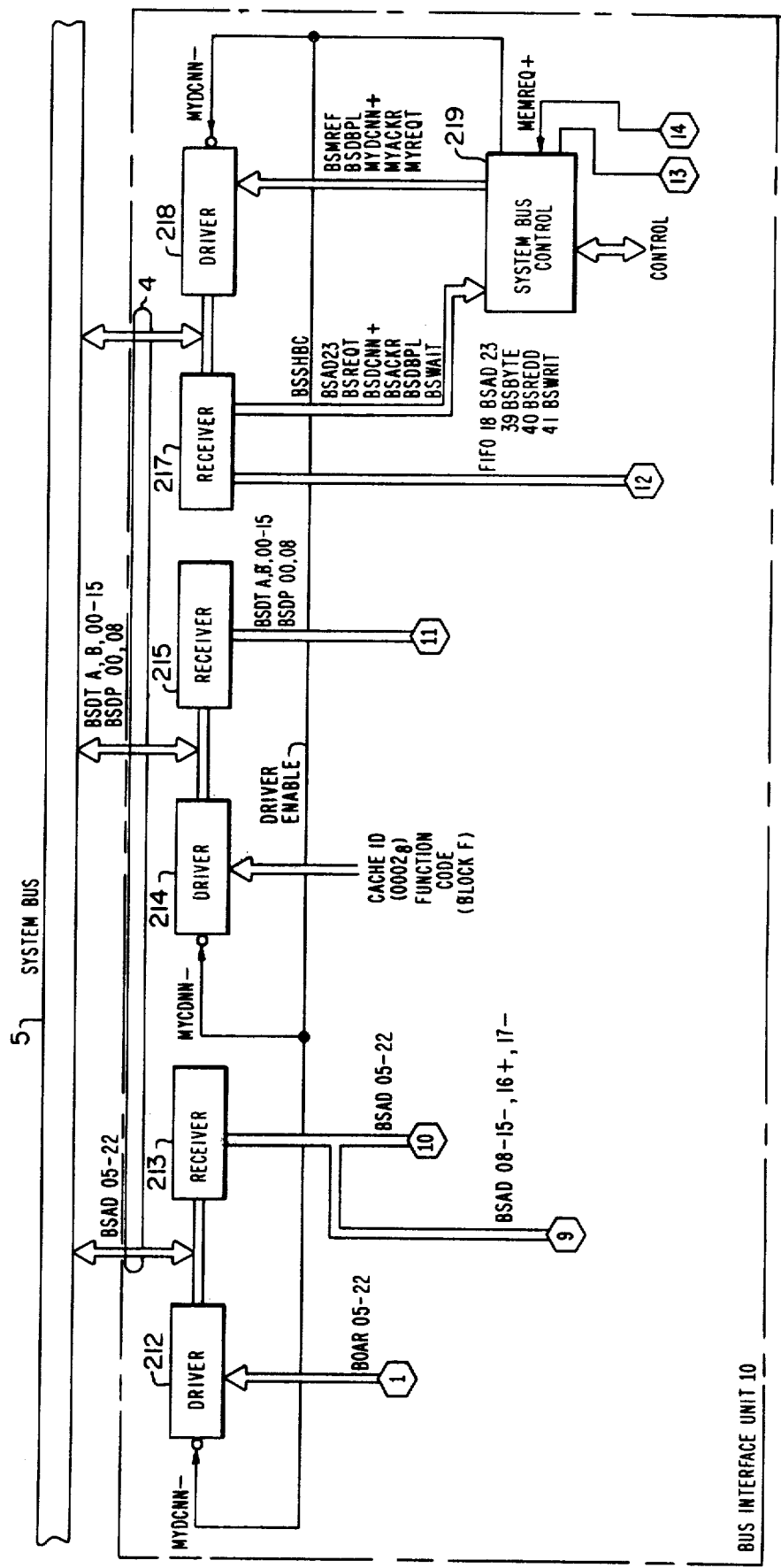
FIG. 2 SHEET 1 OF 4

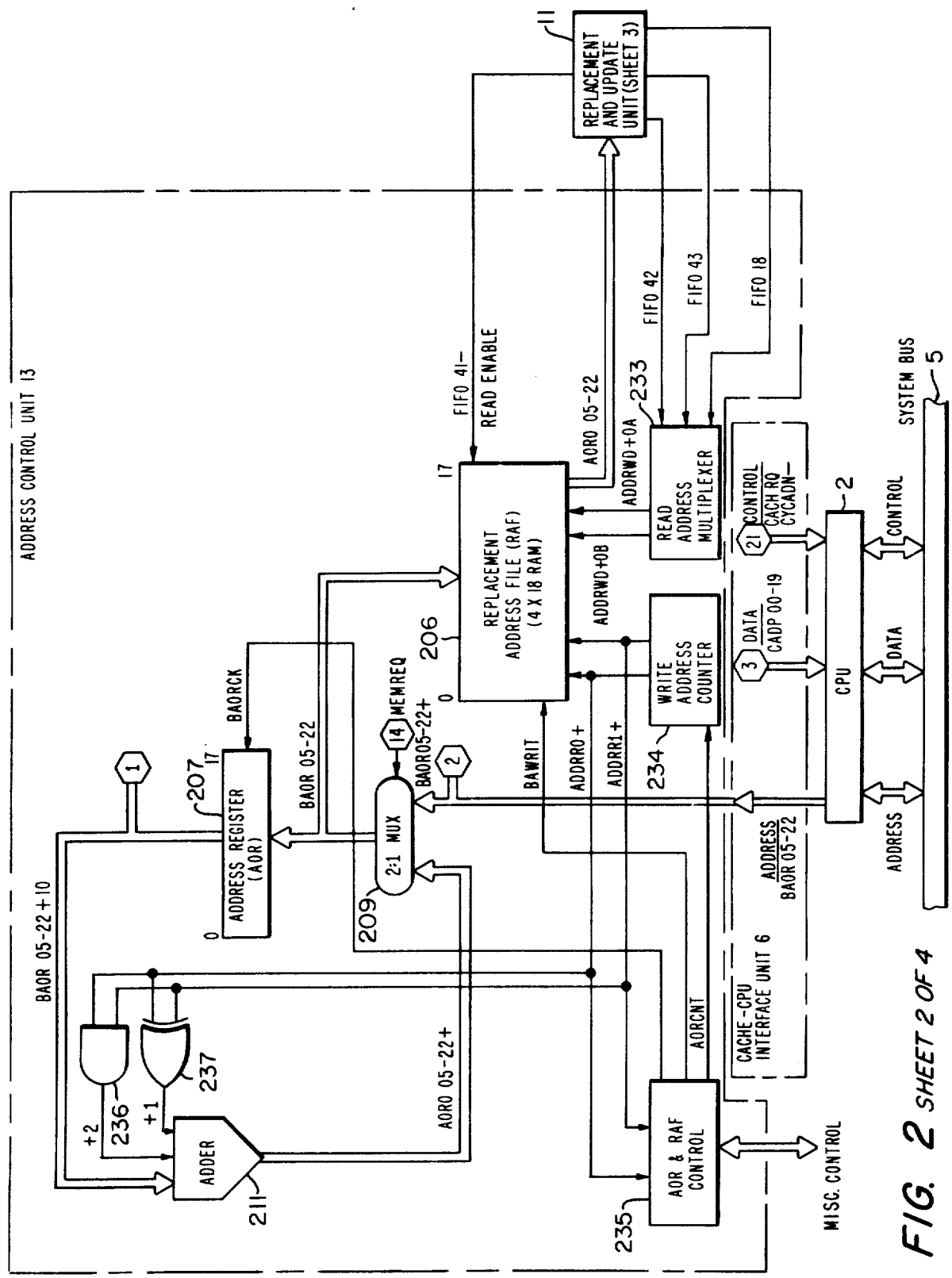
FIG. 2 SHEET 2 OF 4

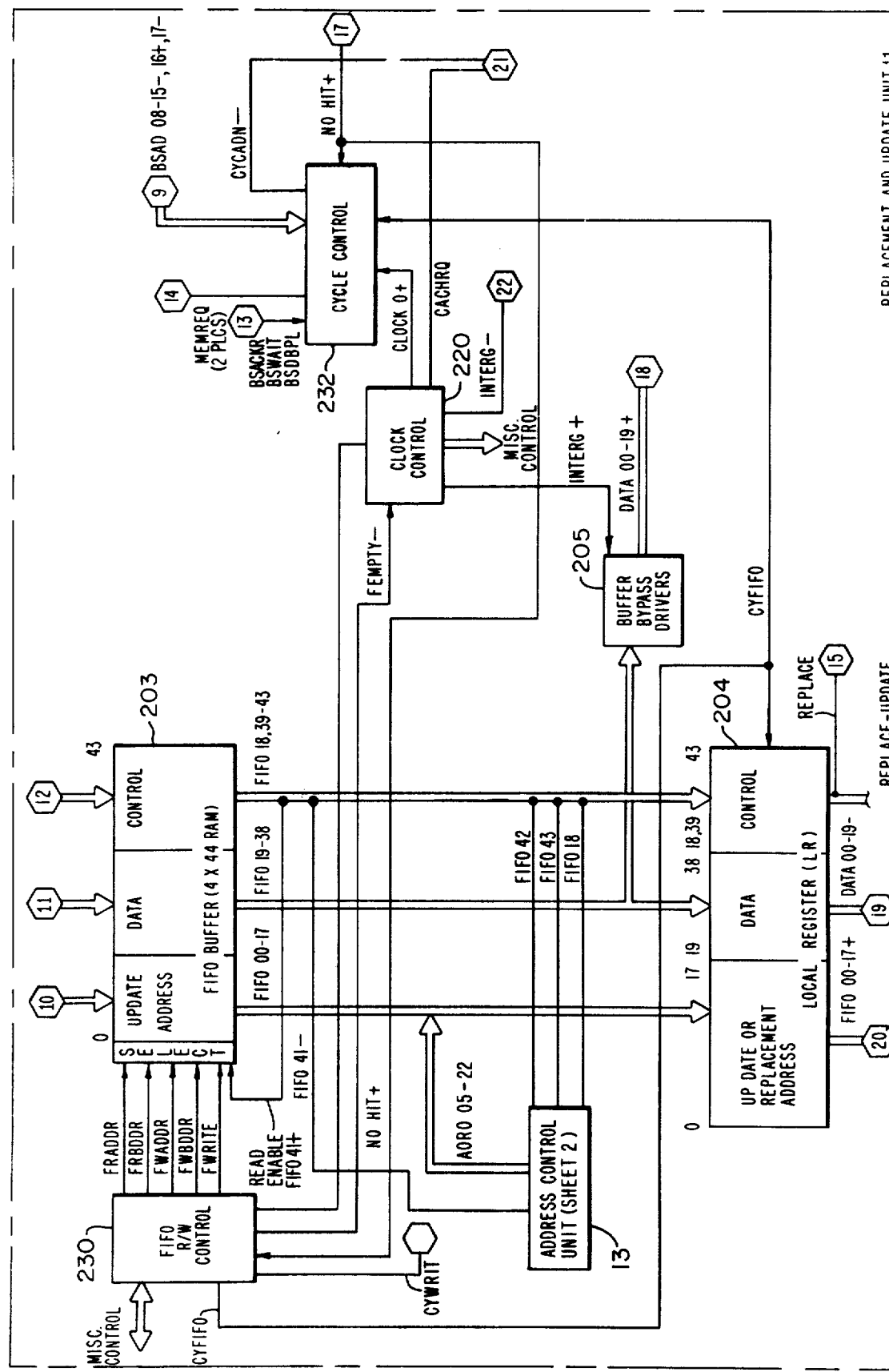
FIG. 2 SHEET 3 OF 4

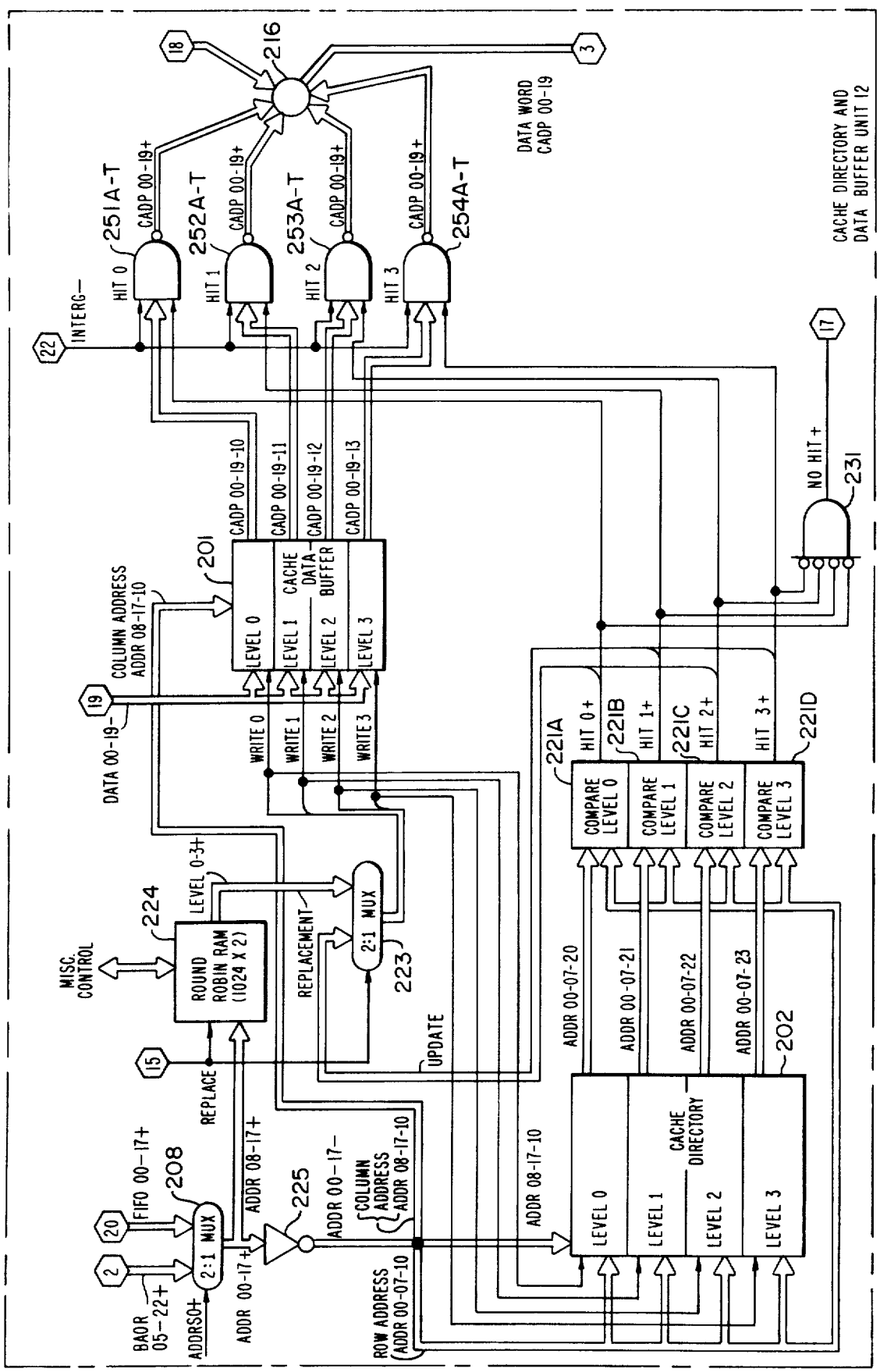
FIG. 2 SHEET 4 OF 4

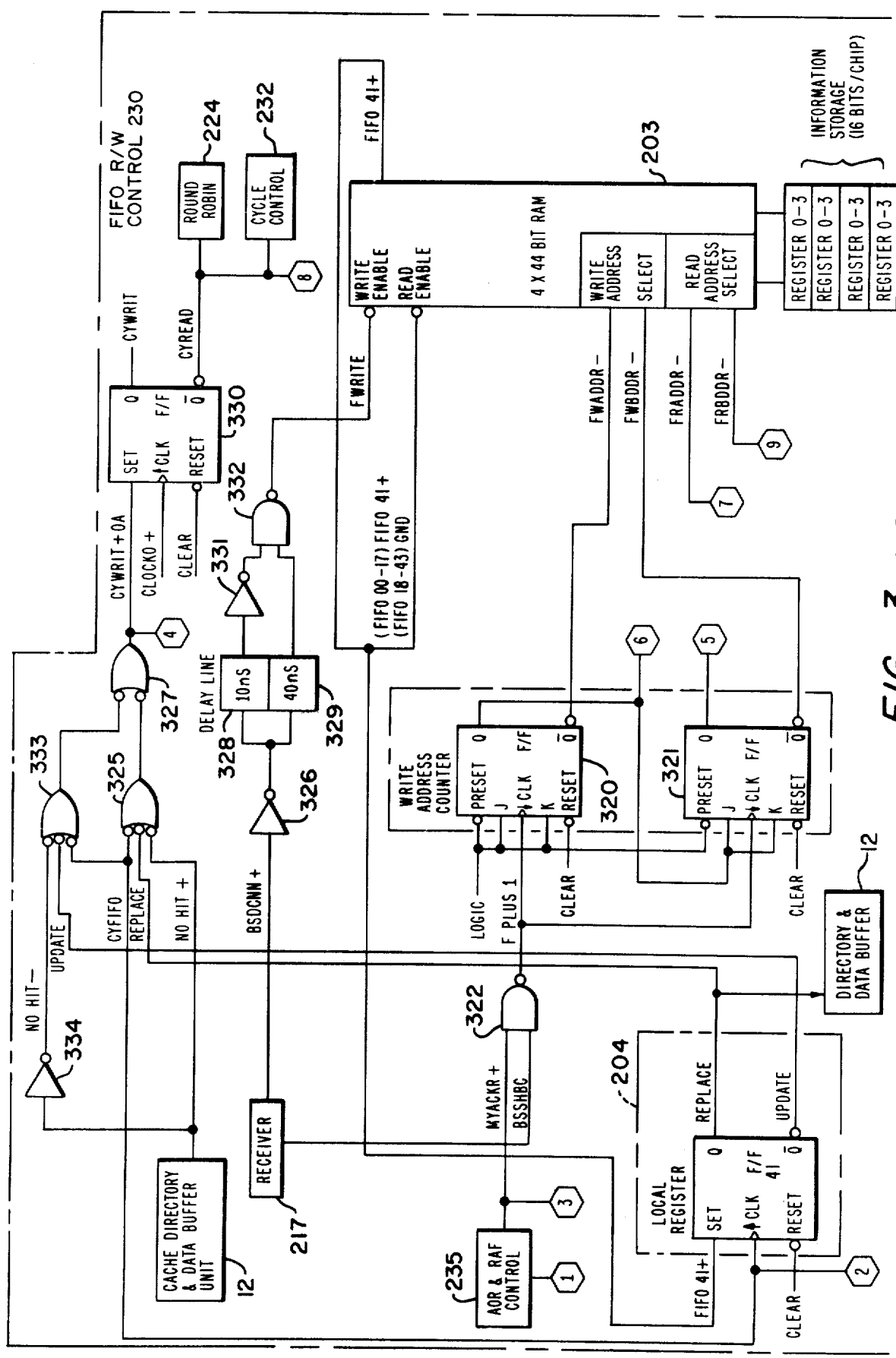
FIG. 3 SHEET 1 OF 2

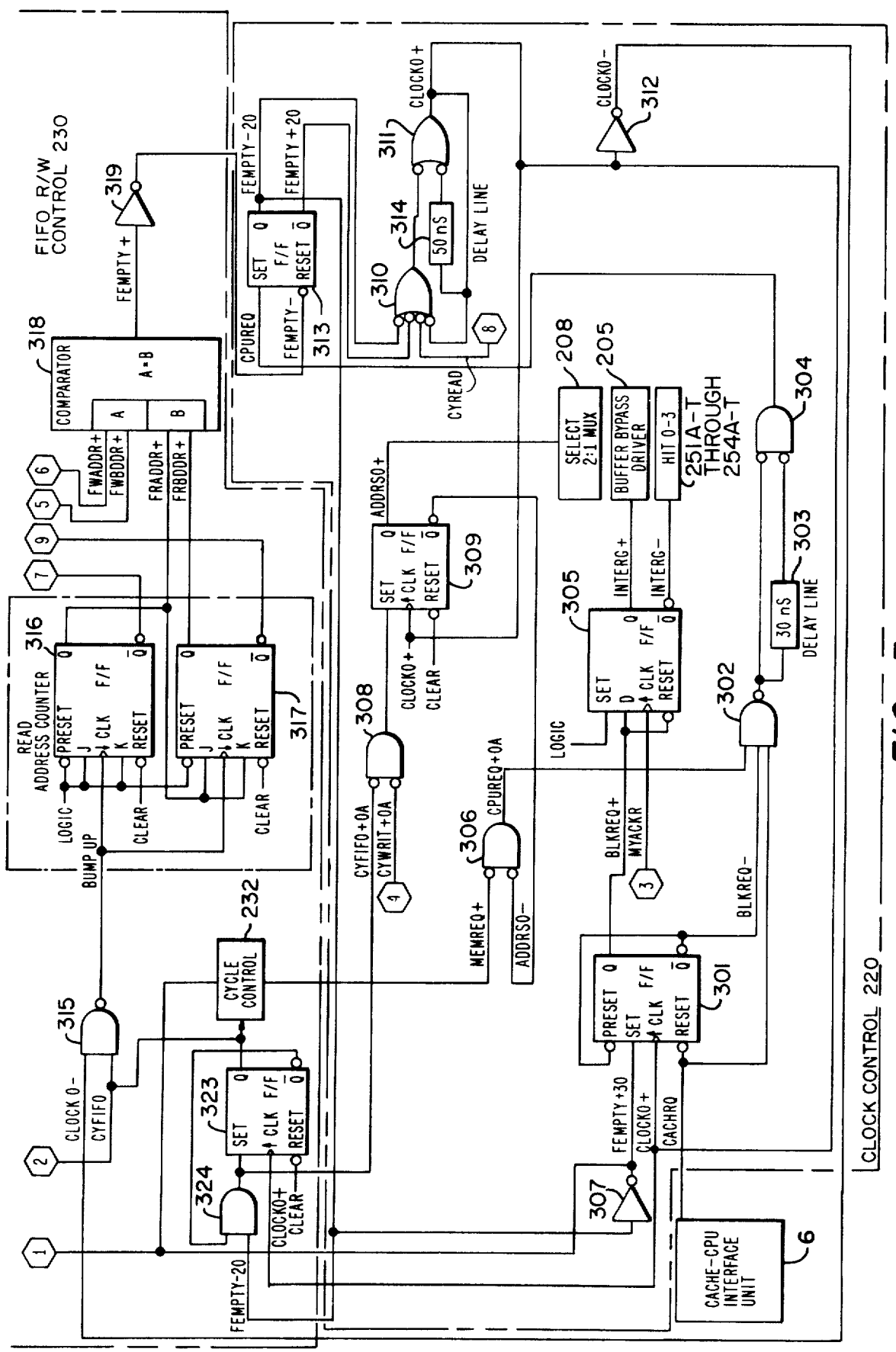
FIG. 3 SHEET 2 OF 2

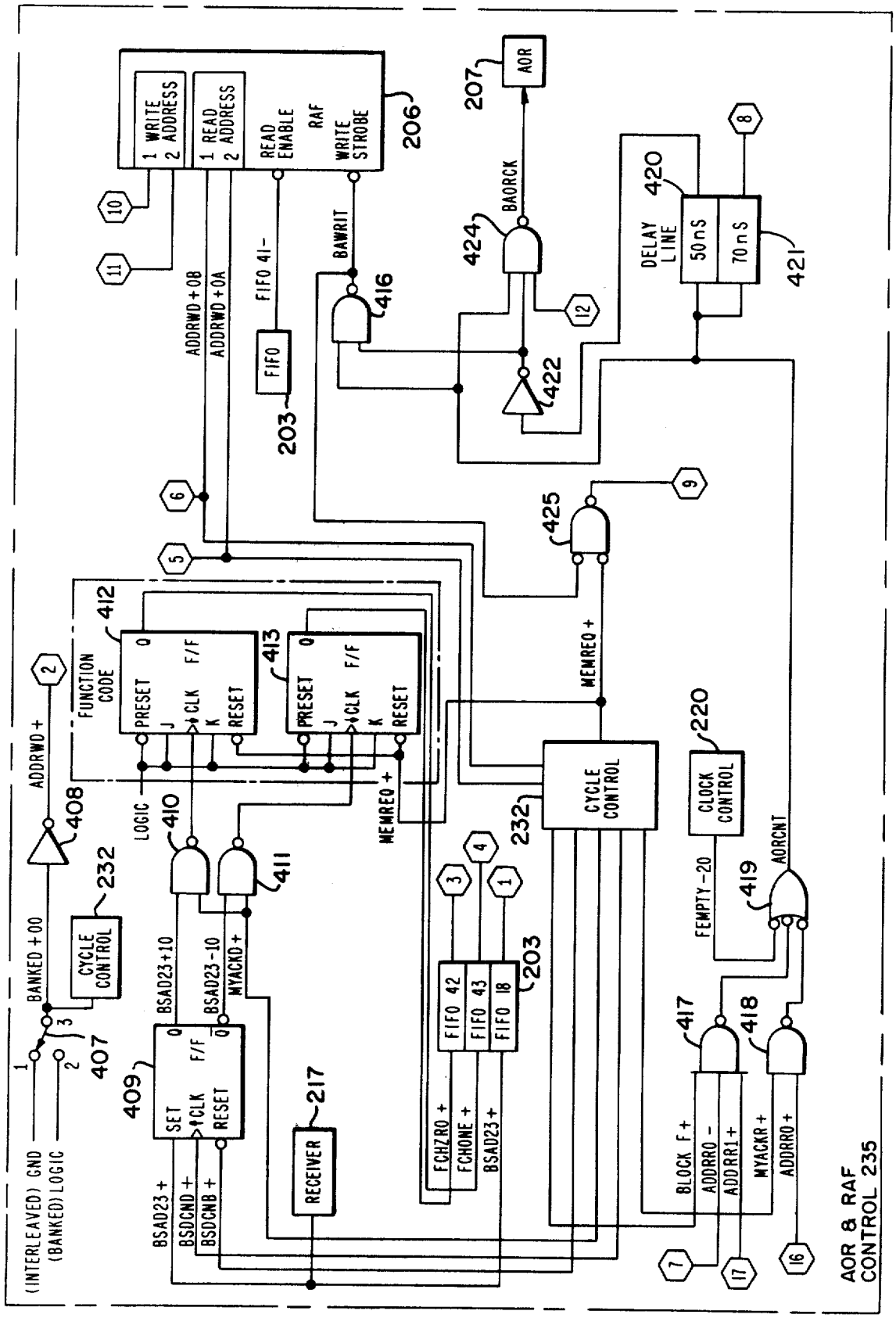

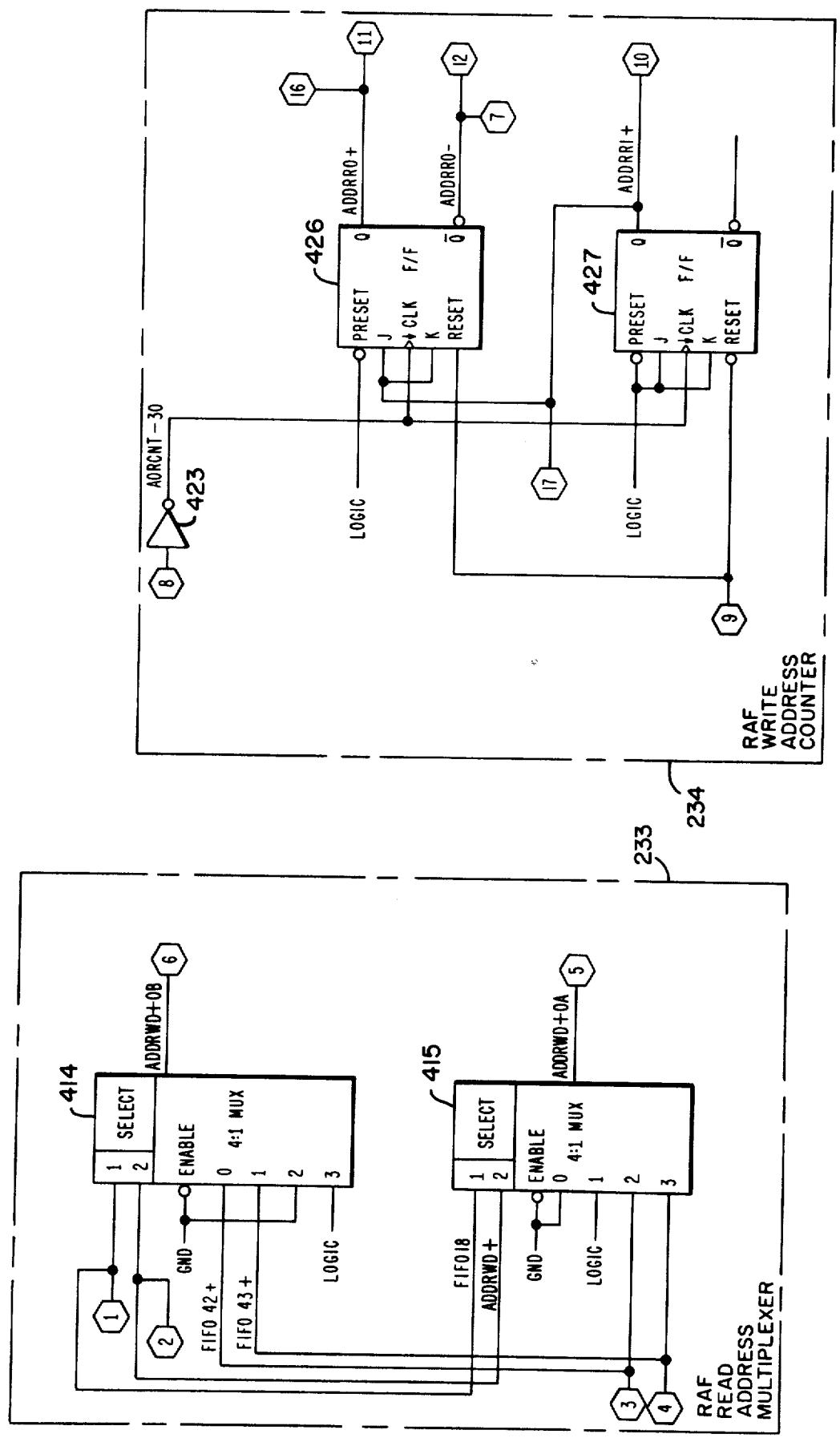
FIG. 4 SHEET 2 OF 2

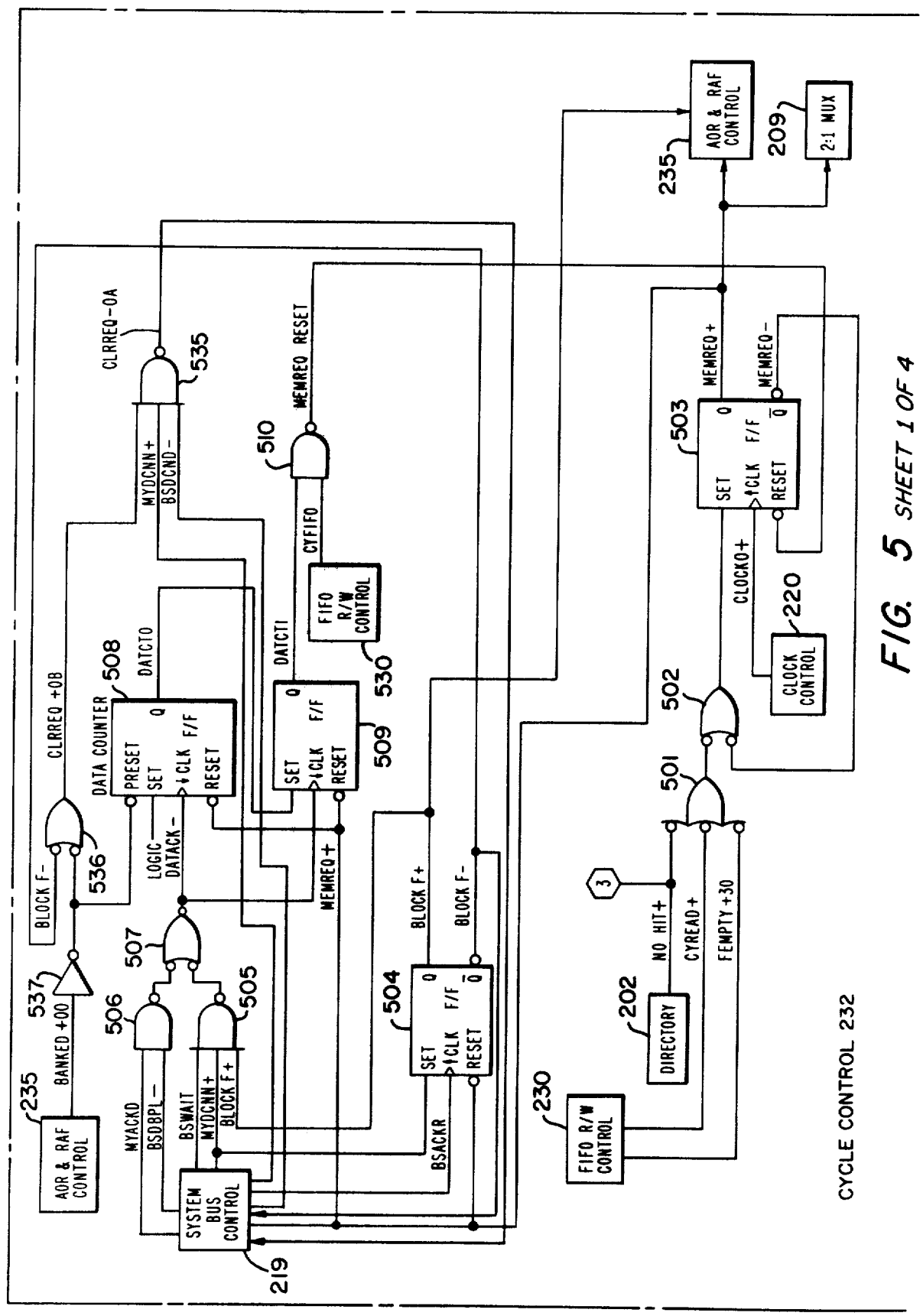
FIG. 5 SHEET 1 OF 4

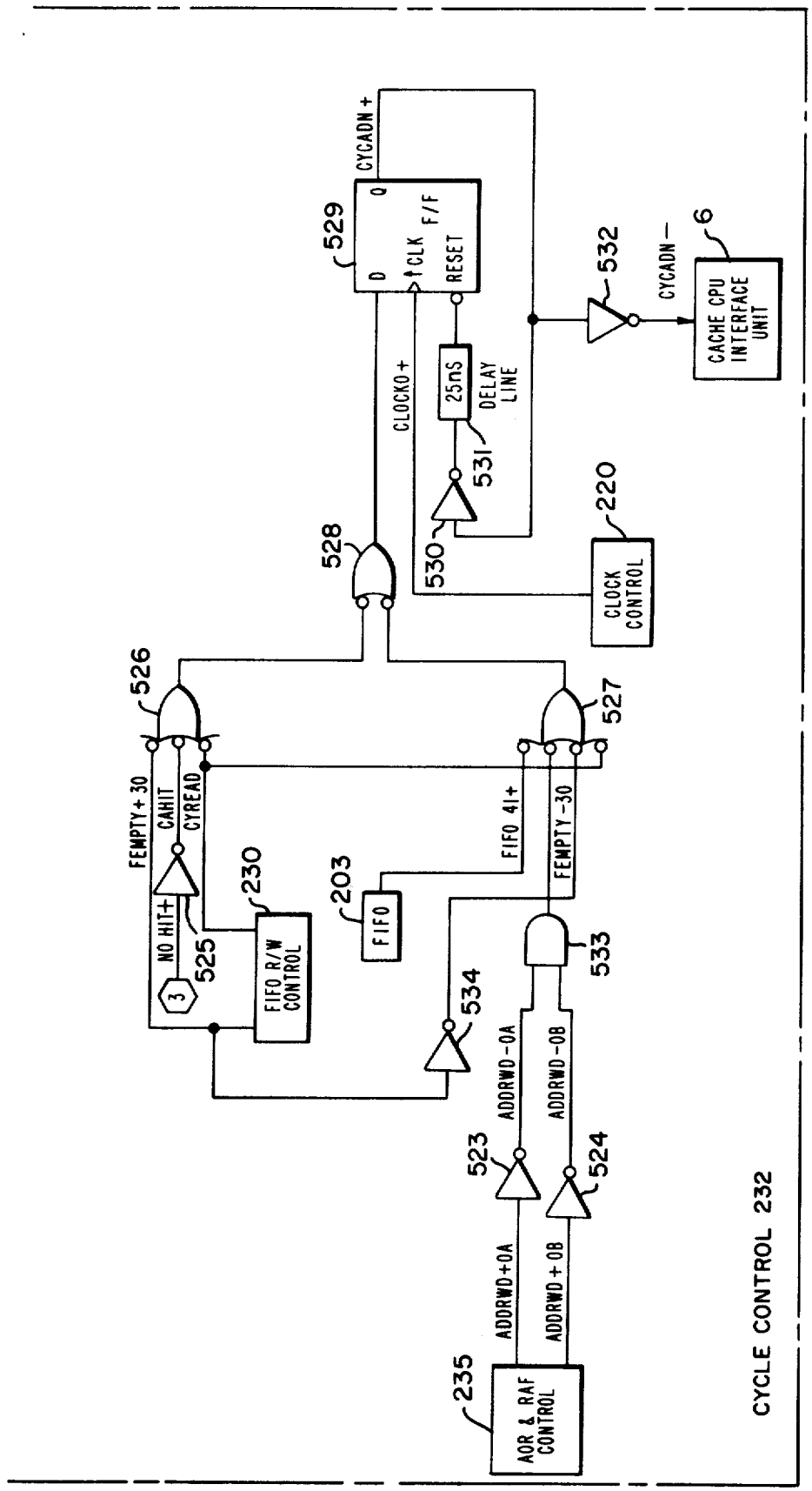

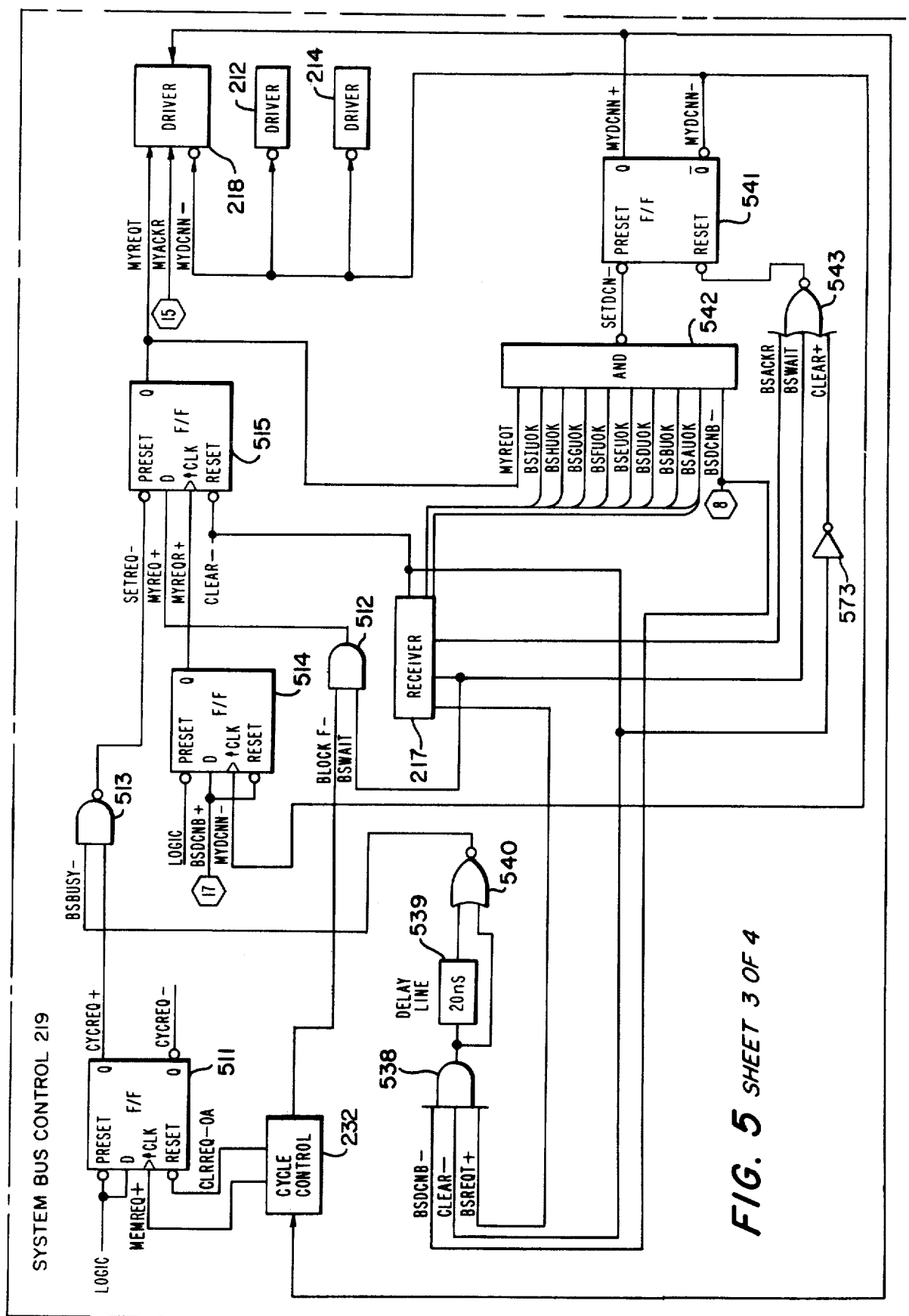
FIG. 5 SHEET 3 OF 4

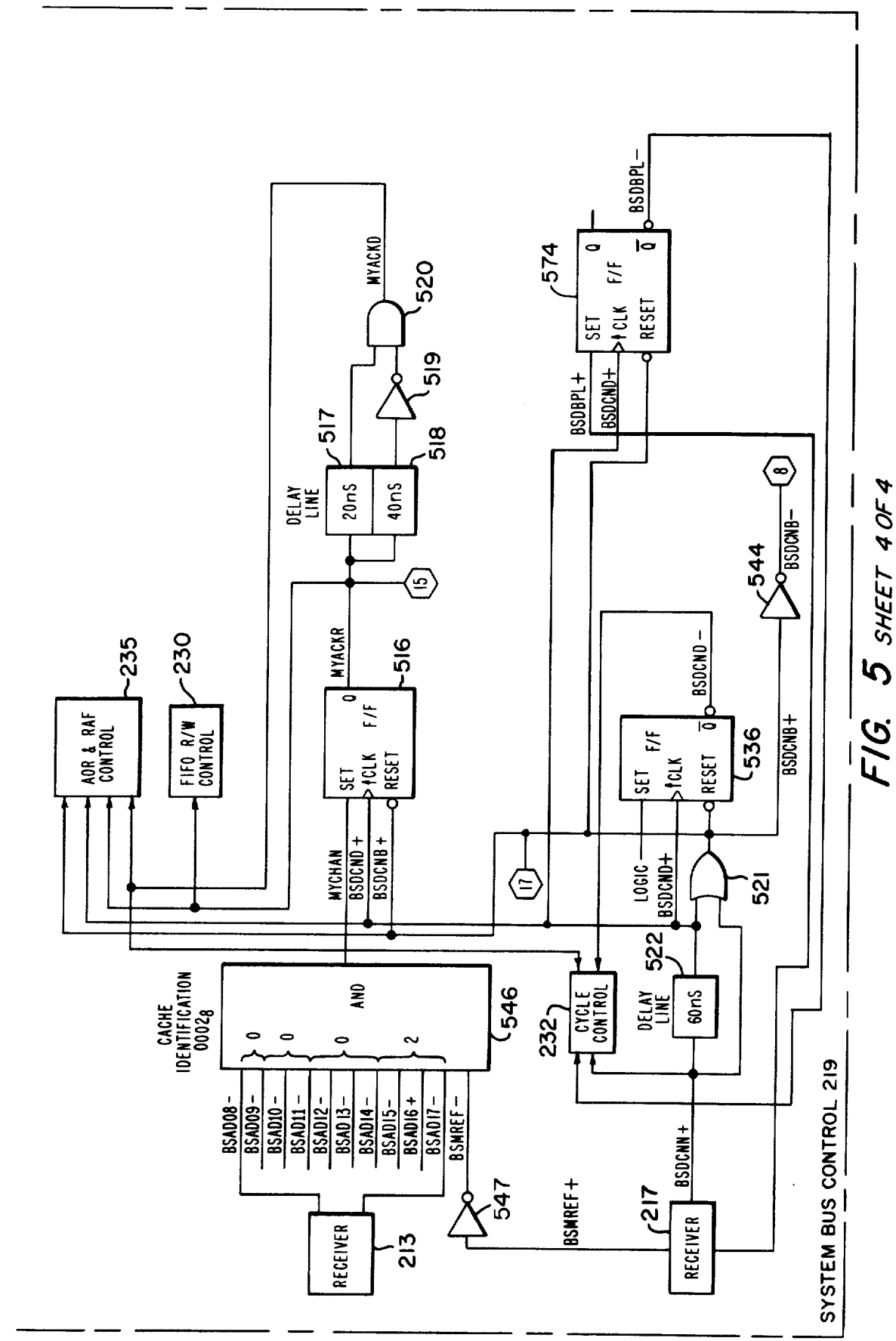
FIG. 5 SHEET 4 OF 4

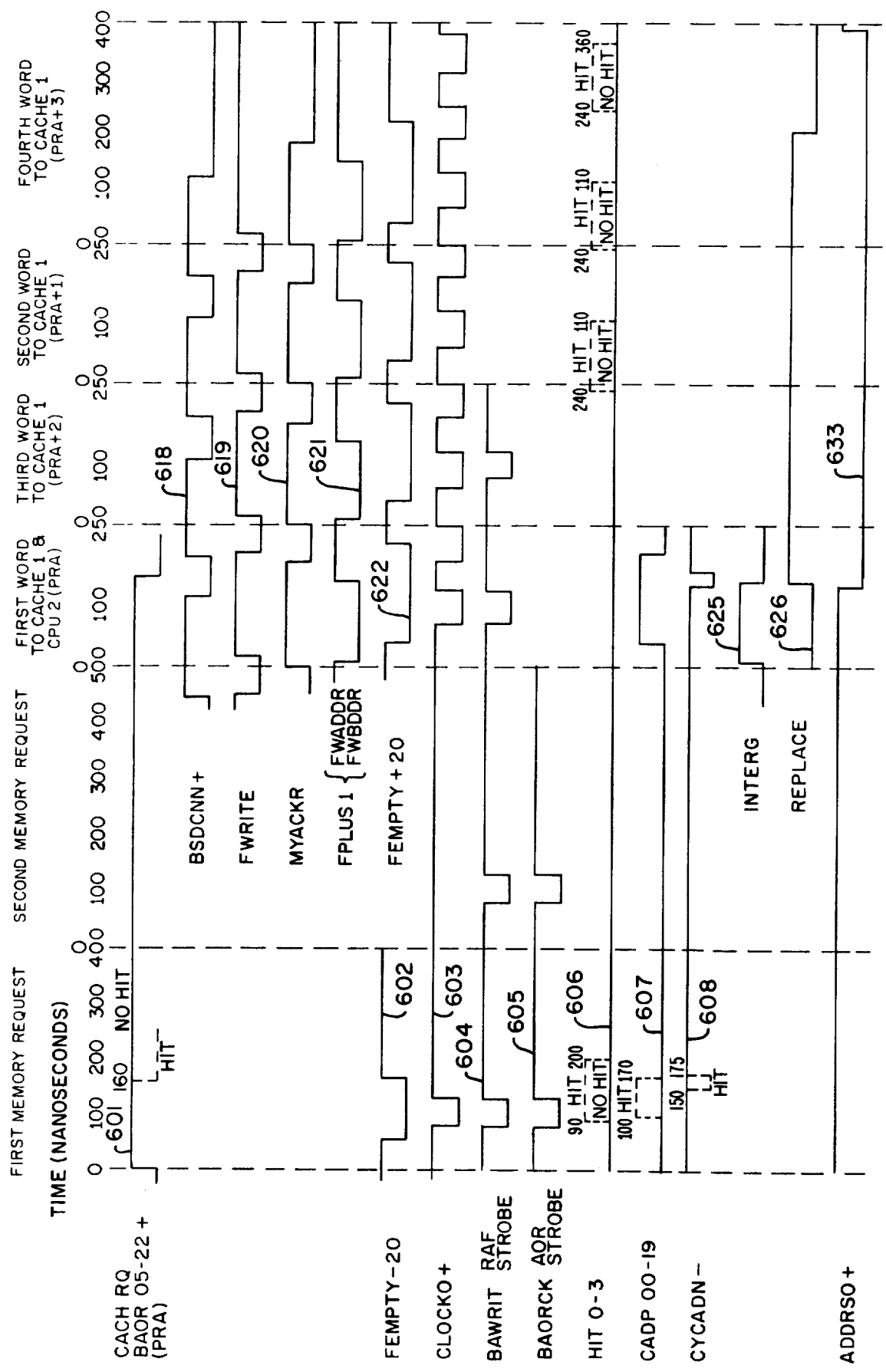
FIG. 6 SHEET 1 OF 2

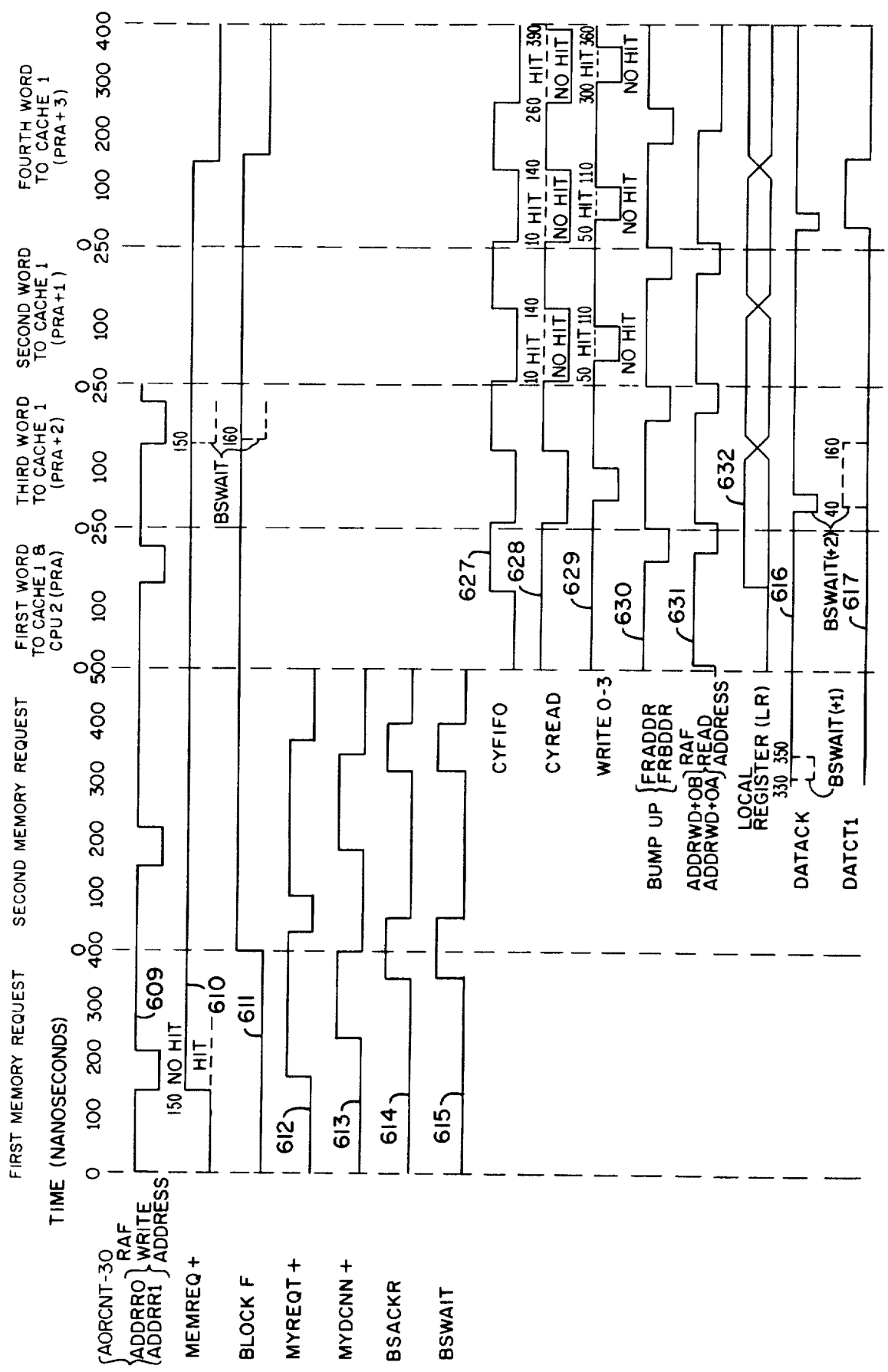
FIG. 6 SHEET 2 OF 2

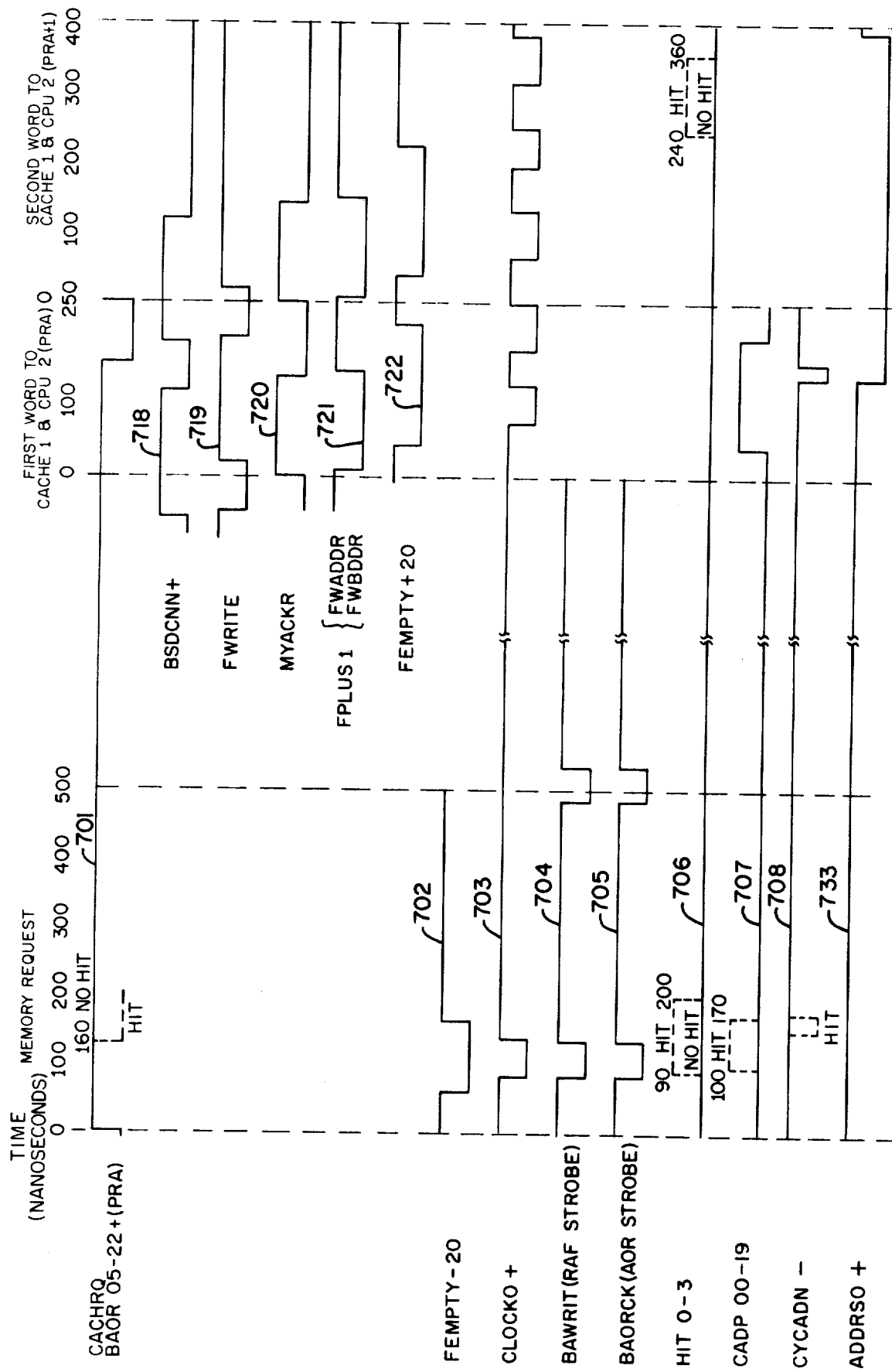
FIG. 7 SHEET 1 OF 2

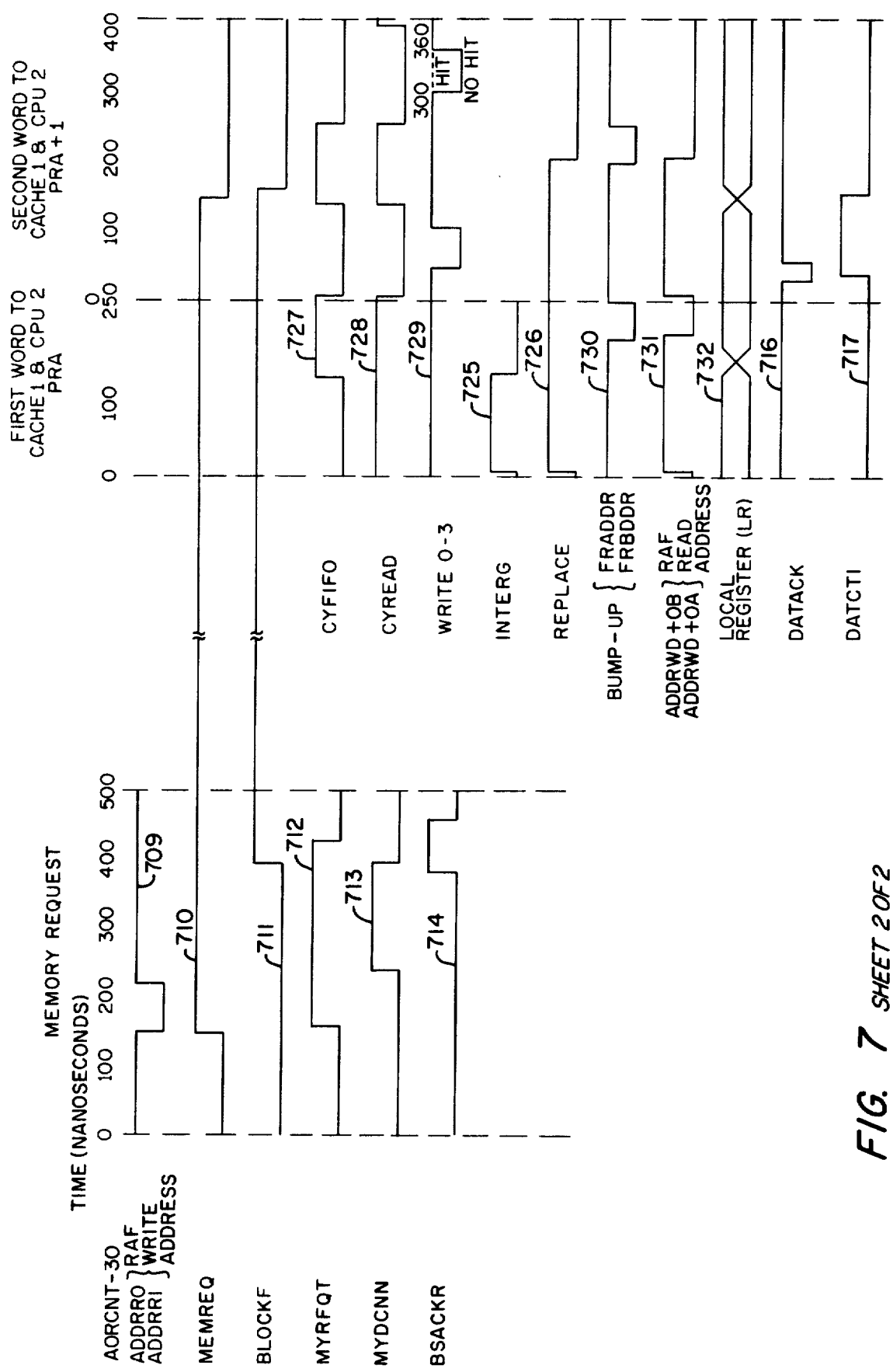
FIG. 7 SHEET 2 OF 2

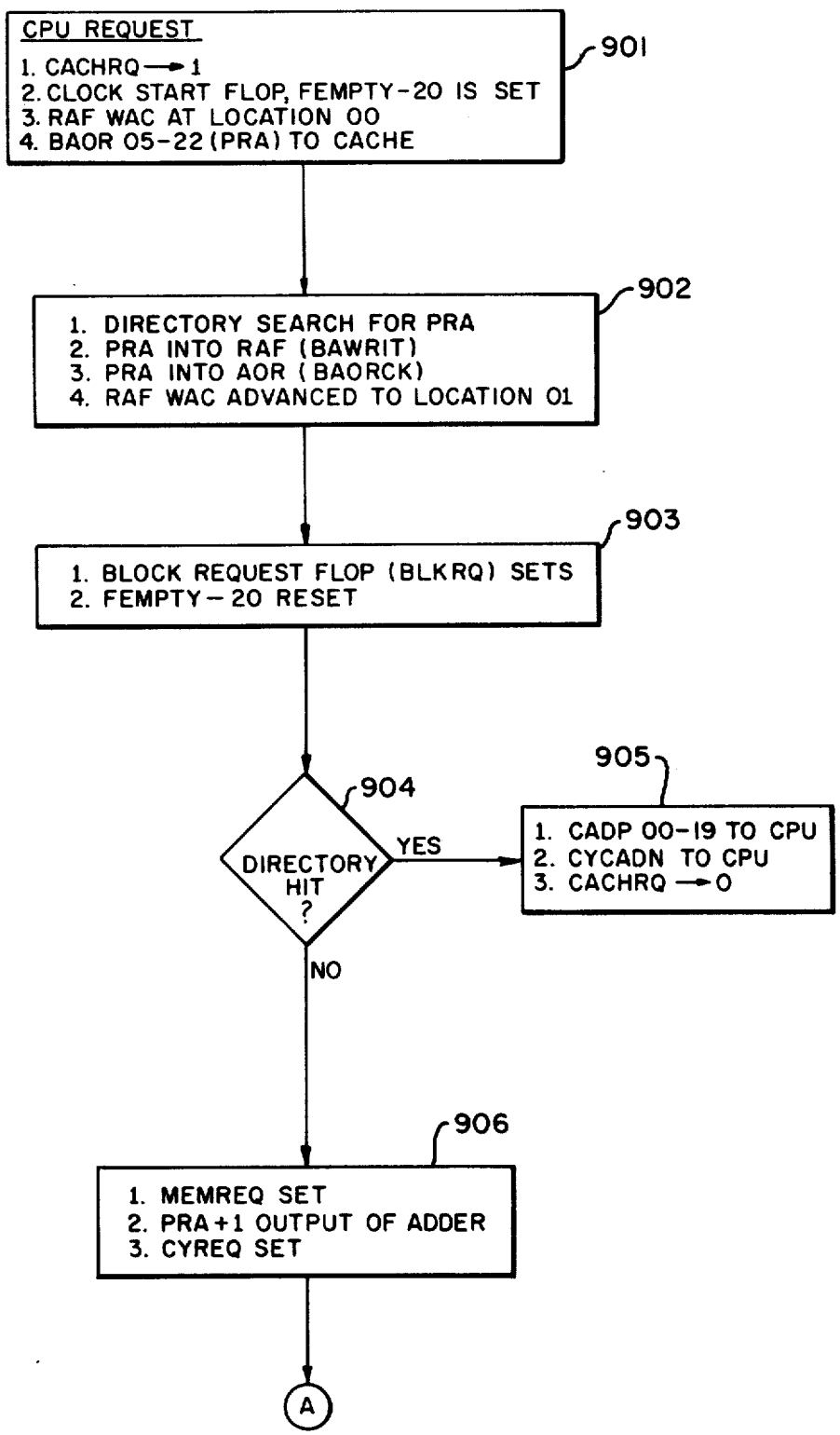
FIG. 9 SHEET 1 OF 7

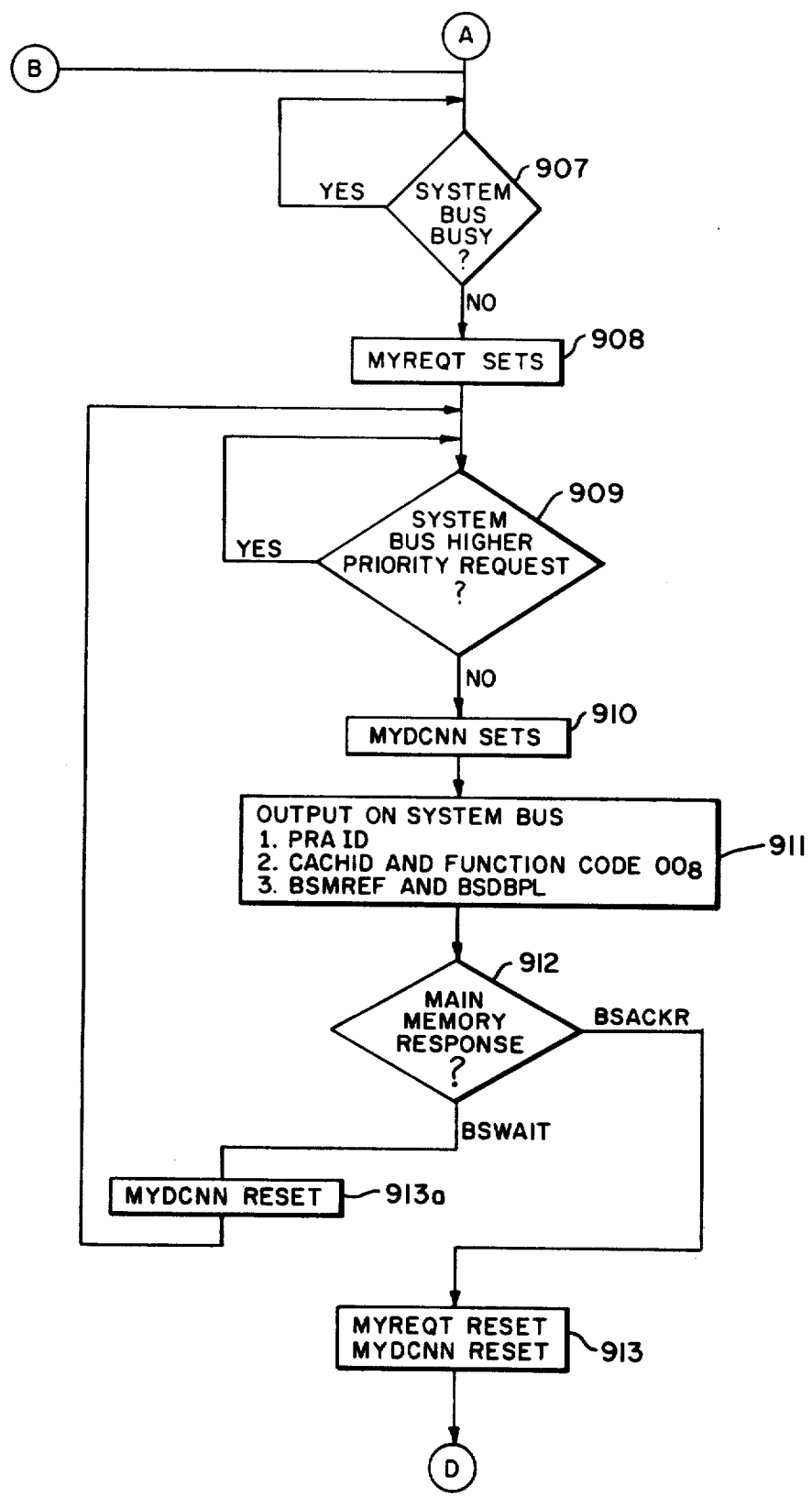
FIG. 9 SHEET 2 OF 7

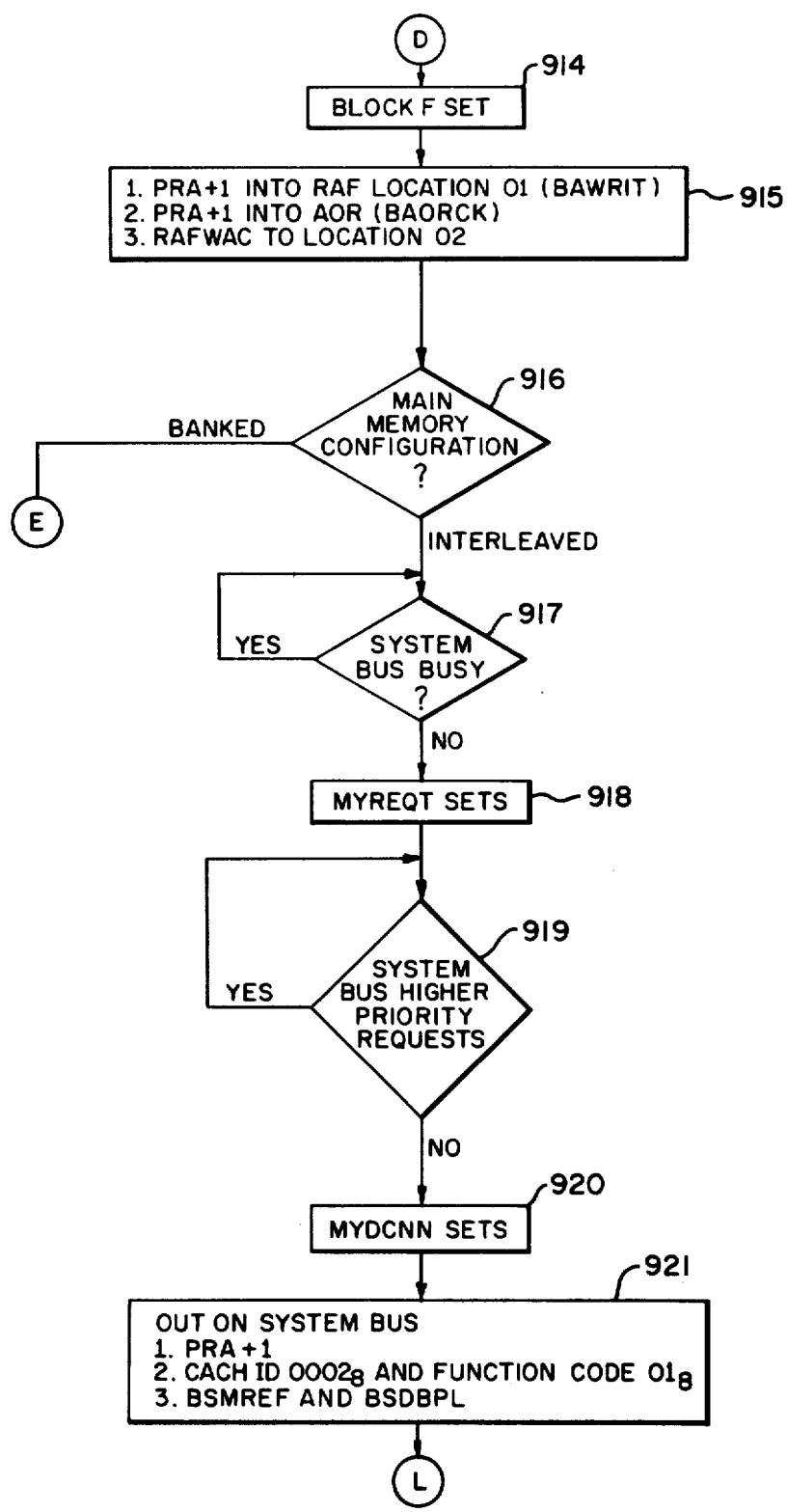
FIG. 9 SHEET 3 OF 7

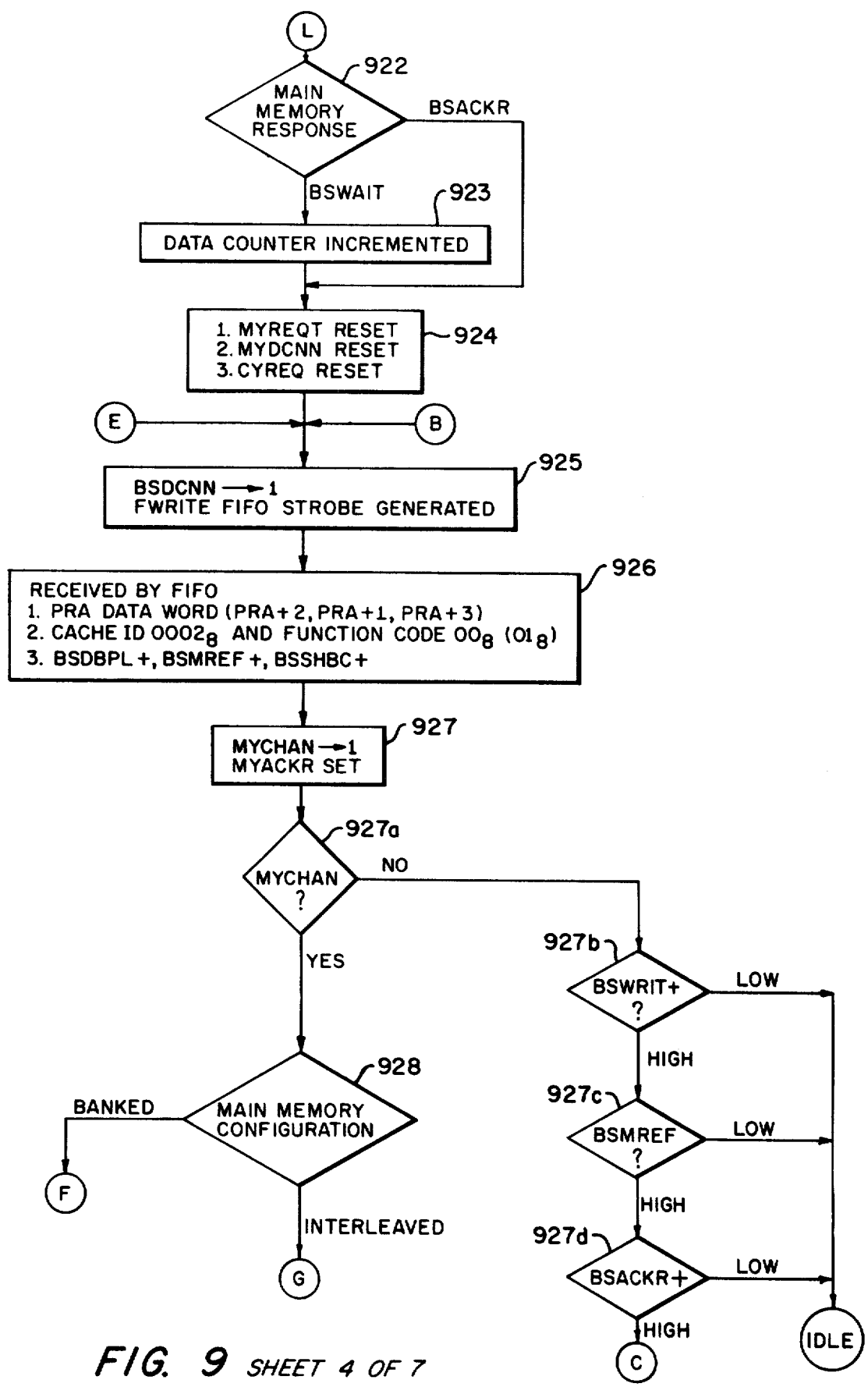
FIG. 9 SHEET 4 OF 7

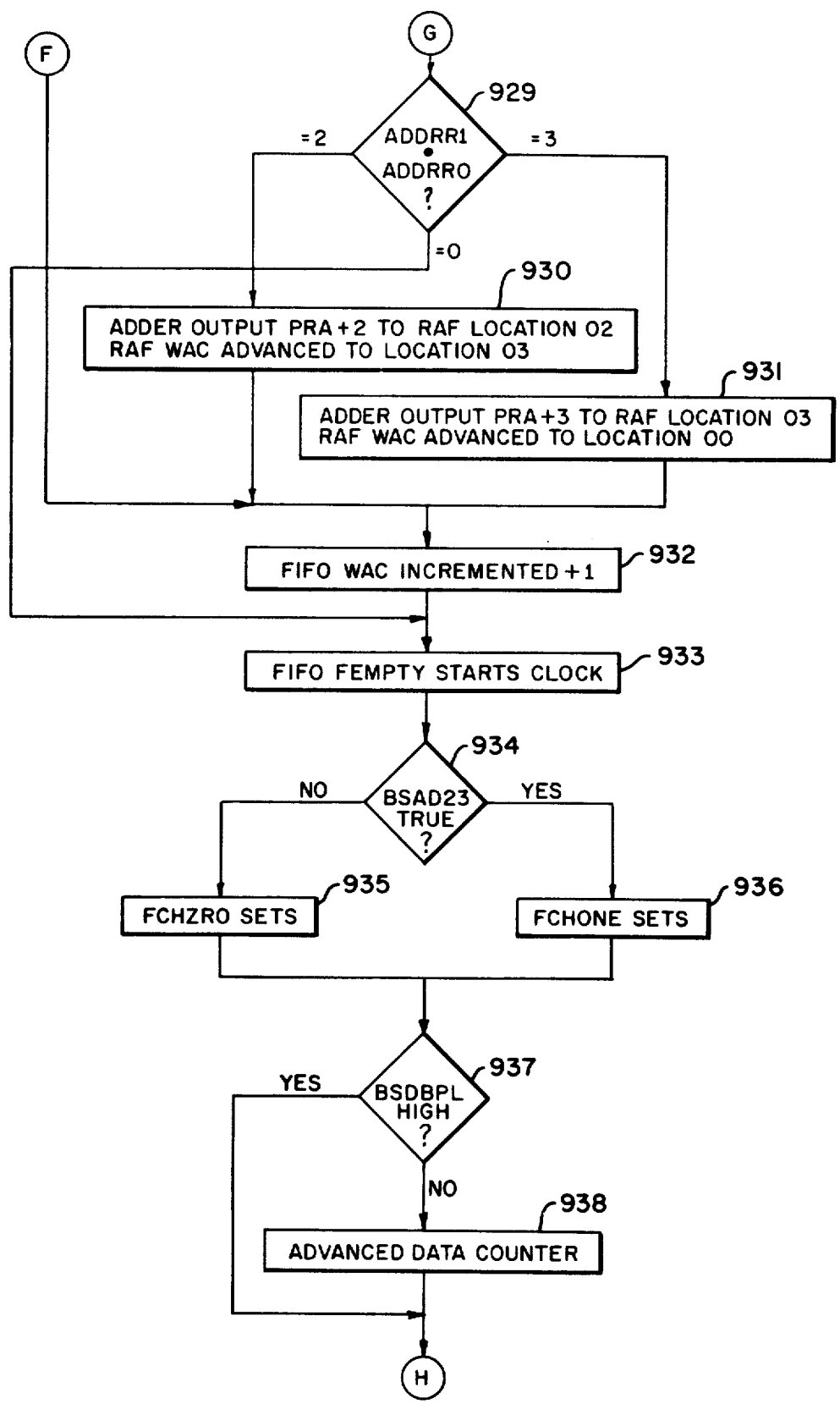
FIG. 9 SHEET 5 OF 7

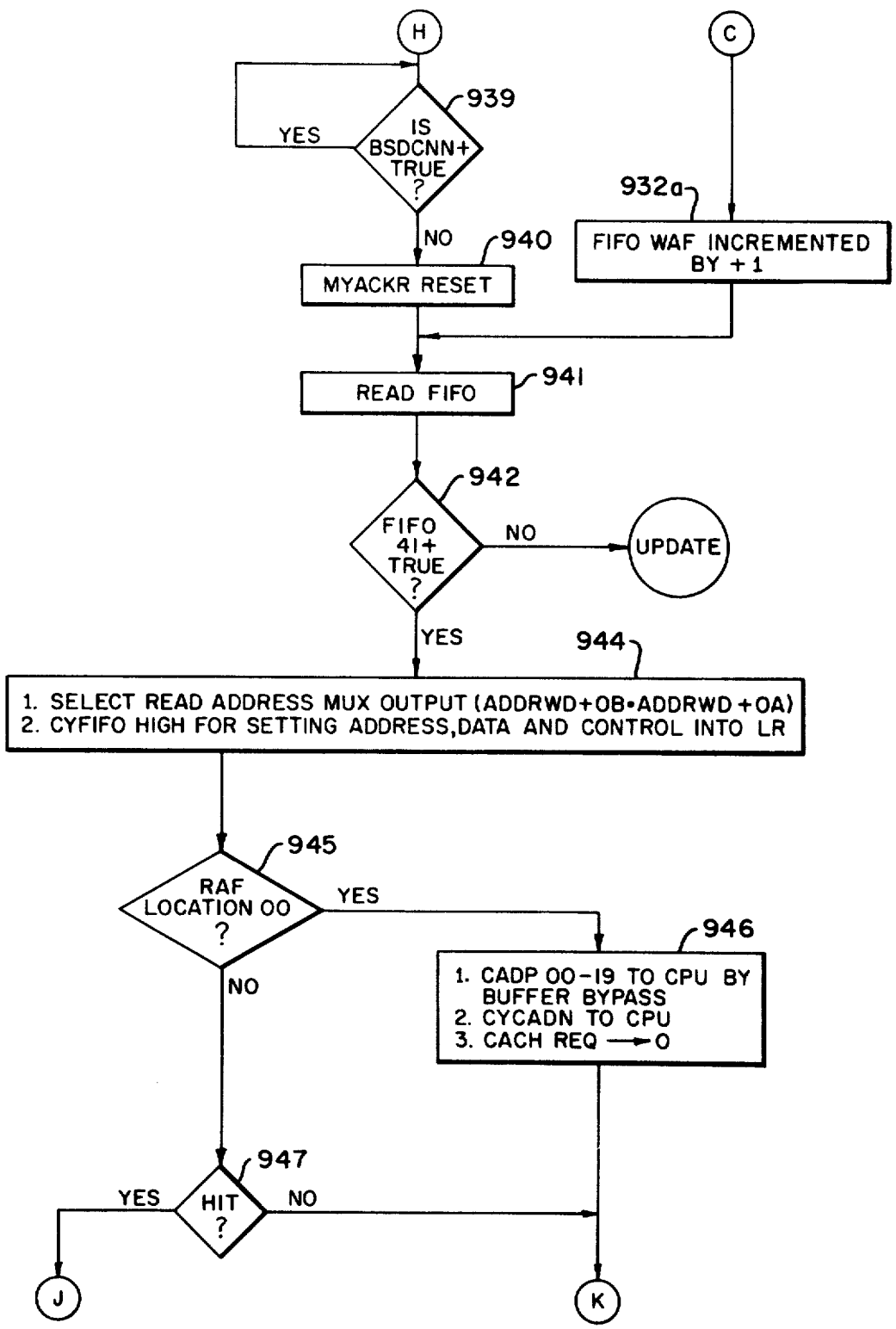
FIG. 9 SHEET 6 OF 7

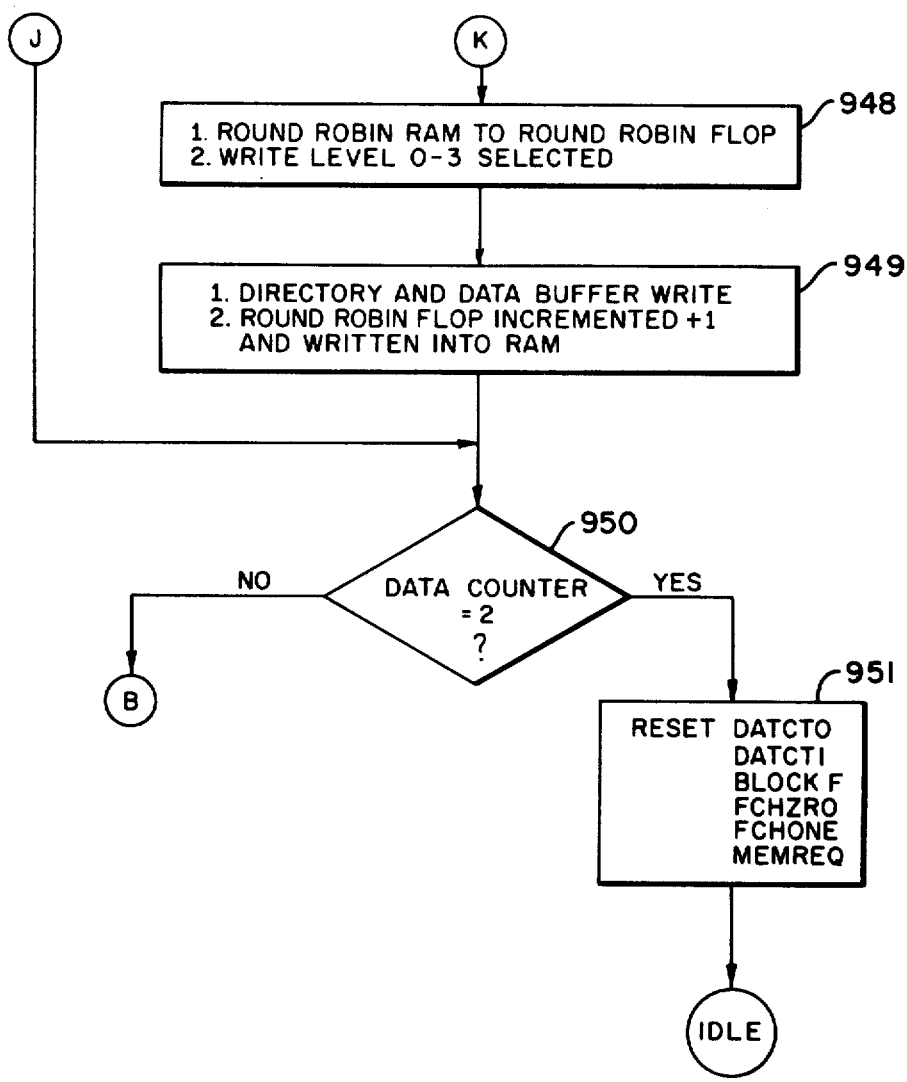
FIG. 9 SHEET 7 OF 7

WORD ORIENTED HIGH SPEED BUFFER MEMORY SYSTEM CONNECTED TO A SYSTEM BUS

RELATED APPLICATIONS

The following patent applications which are assigned to the same assignee as the instant application have been filed on an even date with the instant application and contain related subject matter:

| | TITLE | IN-VENTOR(S) | SERIAL NO. |
|---|---|---|---|
| 1. | FIFO Activity Queue For a Cache Store | T. Joyce | 863,091 |
| 2. | Round Robin Replacement for Cache Store | T. Joyce | 863,102 |
| 3. | Continuous Updating of Cache Store | T. Joyce T. Holtey W. Panepinto, Jr. | 863,092 |
| 4. | High Speed Buffer Memory System with Word Prefetch | T. Joyce T. Holtey | 863,095 |
| 5. | Out-of-Store Indicator for a Cache Store in a Test Mode | T. Joyce W. Panepinto, Jr. | 863,096 |
| 6. | Initialization of Cache Store to Assure Valid Data | T. Joyce W. Panepinto, Jr. | 863,094 |
| 7. | Multi Configurable Cache Store | T. Joyce T. Holtey | 863,098 |
| 8. | Private Cache to CPU Interface in a Bus Oriented System | T. Joyce T. Holtey | 863,097 |

BACKGROUND OF THE INVENTION

1. Field of the Invention

This invention relates generally to minicomputing systems and more particularly to storage hierarchies having a high speed, low capacity storage device coupled to lower speed, high capacity storage devices.

2. Description of the Prior Art

The storage hierarchy concept is based on the phenomenon that individual stored program under execution exhibit the behavior that in a given period of time a localized area of memory receives a very high frequency of usage. Thus, a memory organization that provides a relatively small size buffer at the central processing unit (CPU) interface in addition and includes various levels of increasing capacity slower storage, can provide an effective access time that lies somewhere in between the range of the fastest and the slowest elements of the hierarchy and provides a large capacity memory system that is "transparent" to the software.

This invention takes advantage of a word organized memory. The prior art was limited to having no more than a minimal number of hardware registers which stored main memory addresses and data or instructions. When the need came about for expanded size, low cost high speed buffers, the prior art utilized a block organization.

U.S. Pat. No. 3,231,868 issued to L. Bloom et al. entitled "Memory Arrangement For Electronic Data Processing System" discloses a "look-aside" memory which stores a word in a register and its main memory address is an associated register. To improve performance over the Bloom et al. patent, the prior art went to the block transfer approach. Whenever a word was wanted of cache by the central processor, if that word was not in cache, a block of data including the desired word was sent to cache from main memory with the cache directory address location indicating the main memory address of that block.

An article by C. J. Conti entitled "Concepts for Buffer Storage" published by the IEEE Computer Group News, March, 1969, describes the transfer of 64 byte blocks as used on the IBM 360/85 when a particular byte not currently in the buffer is requested. The IBM 360/85 is described generally on pages 2 through 30 of the IBM System Journal, Volume 71, No. 1, 1968.

A general description of the System/370 Model 165 cache memory can be found on pages 214-220 of a book by Harry Katzen, Jr., entitled "Computer Organization and the System 370", published in 1971 by van Nostrand Reinhold Company, which describes a block transfer of 32 bytes between main storage and the buffer. U.S. Pat. No. 3,588,829 issued to Boland, et al., entitled "Integrated Memory System With Block Transfer To A Buffer Store", discloses the transfer of blocks of 8 words each. U.S. Pat. No. 3,896,419 issued to Lange, et al., entitled "Cache Memory Store In A Processor Of A Data Processing System" describes the transfer of blocks of 4 words each from main memory to cache. U.S. Pat. No. 3,820,078, issued to Curley, et al., entitled "Multilevel Storage Having A Buffer Store System With Variable Mapping Modes", describes the transfer of blocks of 32 bytes or half blocks of 16 bytes each from main memory to the buffer store.

In minicomputers, particularly those with an architecture which has all system units connected to a common bus, it has been found that block transfers of data between main memory and cache place too great a load on the system bus thereby reducing throughput of the overall system.

OBJECTS OF THE INVENTION

It is an object therefore of the invention to provide an improved cache directory and cache data store system in a system bus oriented minicomputing system.

It is another object of the invention to provide an improved cache directory and cache data store to take advantage of a word organized look aside memory without reducing the overall system performance.

SUMMARY OF THE INVENTION

This invention uses the attributes of a word system with simplified circuitry over a block system to efficiently process data with a reasonably high hit ratio. Transferring a word at a time over the system bus between main memory and the cache data store with the cache directory mapping data store location for location increases throughput and decreases the logic circuits required for implementing this system over prior art systems. In the event that the system bus is busy, the data request of main memory by cache of words following the requested word is cancelled. This is covered in copending related application 4 described supra. Also, some of the prior art systems send the complete block in which the desired word is found. Much of this block may not be needed. This system sends to data store the desired word and the following words. This is described in related copending application 4.

The cache system monitors all information on the system bus. If the information is a main memory write reference, and if the address of the information to be written is stored in the directory, then the information in the data buffer at that address is "updated" with the new information from the system bus. This is covered in related copending application 3 described supra.

The central processor sends information to the main memory over the system bus but requests information from the cache over a private CPU-cache interface by sending the address of the requested information to cache. If that address is stored in the directory, then the data from the data store at that address is sent to the central processor over the private CPU-cache interface. If the address is not stored in the directory, then the cache unit requests this information of main memory by sending the address of the requested information out on the system bus as a memory request. The private CPU-cache interface is covered in related copending application 8 described supra.

Cache in its continuous monitoring of the system bus will receive the information in response to the memory request. The data received on the system bus is sent to the central processor over the private CPU-cache interface. An 18-bit address is sent to the directory. The 8 high order address bits are written into the directory at the address specified by the 10 low order address bits. The data sent to the CPU is written into the data store at the address specified by the 10 low order bits. This data replaces the oldest data previously written into that address. A round robin counter keeps track of, for each address, the next level of cache to receive the "replacement" data. The round robin counter is covered in related copending application 2 described supra.

The system bus interface unit connects the cache memory unit to the system bus enabling the cache memory unit to access main memory and read out CPU required information. The system bus has been covered by U.S. Pat. Nos. 3,993,981 entitled "Apparatus for Processing Data Transfer Requests in a Data Processing System" and 4,030,075 entitled "Data Processing System Having Distributed Priority Network".

BRIEF DESCRIPTION OF THE DRAWINGS

FIG. 2 is a block diagram of the cache system;
FIG. 3 is a logic circuit diagram of Clock Control and FIFO R/W Control;
FIG. 4 is a logic circuit diagram of AOR and RAF Control, the RAF Write Address Counter and the RAF Read Address Multiplexer;
FIG. 5 is a logic circuit diagram of Cycle Control and System Bus Control;
FIG. 6 is a timing diagram of the prefetch operation with an interleaved memory;
FIG. 7 is a timing diagram of the prefetch operation with a banked memory;
FIG. 9 is a flow diagram illustrating the prefetch operation.

DESCRIPTION OF THE PREFERRED EMBODIMENTS

OVERALL SYSTEM

Figure 1:
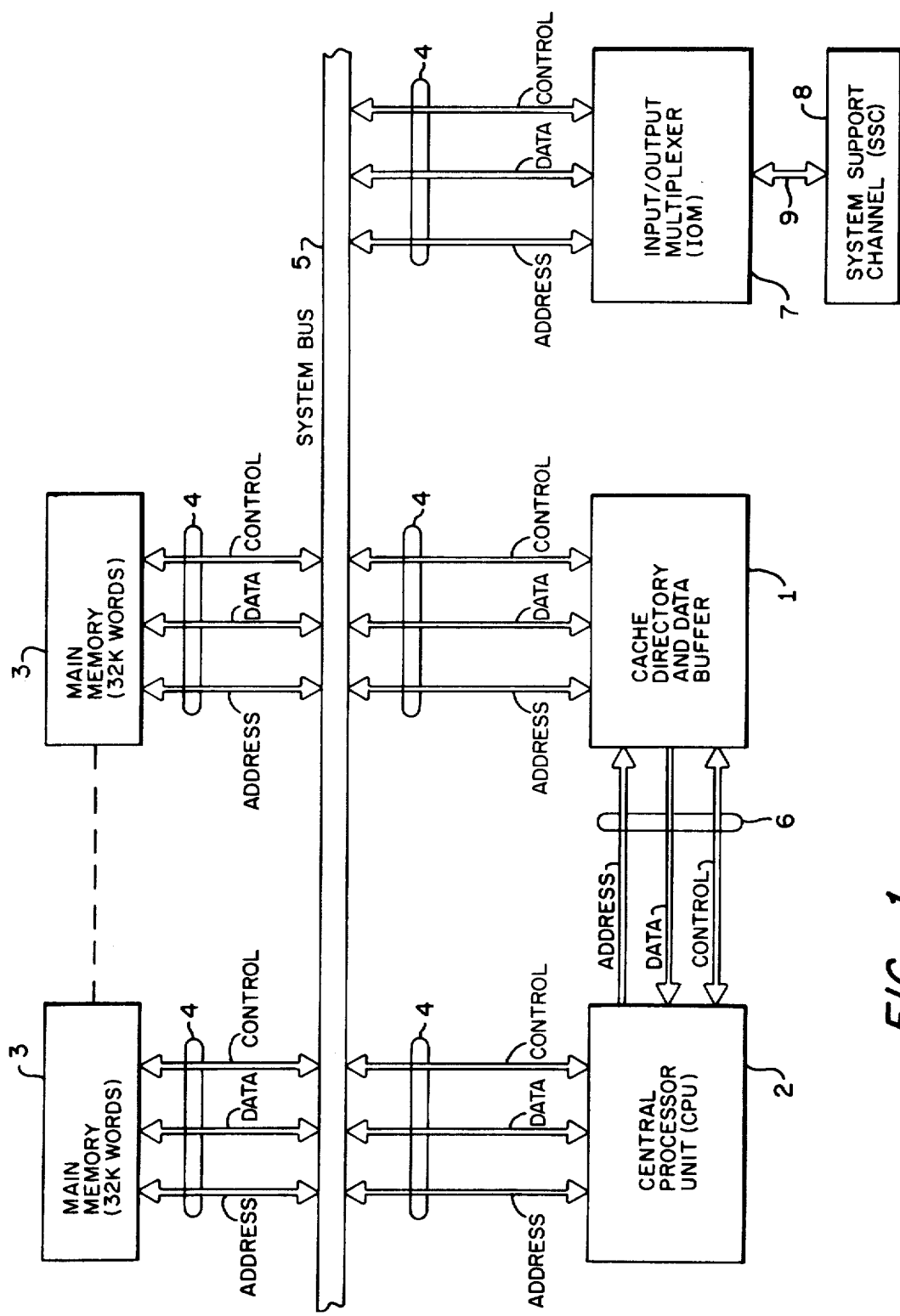
FIG. 1 is a block diagram of the overall system.

FIG. 1 is a block diagram of a minicomputer system which comprises a central processor unit (CPU) 2, a main memory 3, an input/output multiplexer (IOM) 7, a system bus 5, a cache directory and data buffer (cache) 1 and a system support channel (SSC) 8. Not shown are the normal complement of standard peripherals connected to the system by SSC 8. With the exception of SSC 8, each unit couples to the system bus 5 via an interface signal bus 4; SSC 8 couples to the IOM 7 through input/output (I/O) bus 9. In addition, CPU 2 and cache 1 are interconnected by a private interface signal bus 6. IOM 7, I/O bus 9 and SSC 8 are not pertinent to the invention and will not be described in detail.

CPU 2 is designed for use as a communications network processor and is a firmware controlled 20 bits per word binary machine. Main memory 3 can be added to the system in modules of 32,768 words up to a maximum of 8 modules or 262,144 words. Main memory 3 is made up of random access MOS chips with 4,096 bits stored in each chip and has a read/write cycle time of 550 nanoseconds. Cache 1 provides an intermediate high speed storage with a maximum read/write cycle time of 240 nanoseconds. CPU 2 requests a data word from cache 1 over private interface 6 and obtains the data word if in cache 1 in 110 nanoseconds over private interface bus 6. If the requested data is not in cache 1, then CPU 2 receives the data via main memory 3, bus 5, cache 1 and bus 6 in 960 nanoseconds. If cache 1 was not in the system, then the CPU 2/main memory 3 read access time is 830 nanoseconds. Using the prefetch techniques of this invention assures that in most cases over 90% of the requested data words are stored in cache 1 thereby greatly increasing the throughput of the system using cache 1 over a system without cache 1. System bus 5 permits any two units on the bus to communicate with each other. To communicate, a unit must request a bus 5 cycle. When the bus 5 cycle is granted, that unit may address any other unit on bus 5. I/O bus 9 is identical to system bus 5 in performance and in signal makeup. IOM 7 controls the flow of data between bus 5 and the various communications and peripheral controllers of the system via I/O bus 9. SSC 8 is a microprogrammed peripheral controller which provides control for various devices (not shown). Other controllers (not shown) may also connect to I/O bus 9.

CPU 2 updates data in main memory 3 by sending the data word with its main memory 3 address and the appropriate control signals out on bus 5. Cache 1, since it reads all information on bus 5 into a register in cache 1 will be updated if that data word location is stored in cache 1. This assures that information stored at each address location in cache 1 is the same as information stored at the corresponding address location in main memory 3.

CPU 2 requests data from cache 1 by sending the requested address (PRA) over private interface 6 to cache 1. If the data is stored in cache 1, the requested data is sent back to CPU 2 from cache 1 over private interface 6. If the requested data is not in cache 1, cache 1 requests the data of main memory 3 over bus 5 and in addition cache 1 requests three additional data words from address locations PRA+1, PRA+2 and PRA+3 for the interleaved memory or one additional word of data from address location PRA+1 for the banked memory. When the data words are received from main memory 3 over bus 5 by cache 1, they are written into cache 1 and the requested data word is sent from cache 1 to CPU 2 over private interface 6.

CACHE SYSTEM

FIG. 2 shows the cache 1 system which includes a bus interface unit 10, a replacement and update unit 11, a cache directory and data buffer unit 12, an address control unit 13 and a private cache-CPU interface unit 6. FIG. 2 is made up of 4 sheets. The information flow is best seen with sheet 2 at the left, sheet 1 on the right, sheet 3 below sheet 1 and sheet 4 below sheet 3.

BUS INTERFACE UNIT 10—FIG. 2, Sheet 1

Bus interface unit 10, FIG. 2, comprises drivers 212, 214 and 218, receivers 213, 215 and 217, and system bus control logic unit 219.

Bus interface unit 10 connects to bus 5 through interface signal bus 4. Bus 5, interface signal bus 4 and system bus control 219 are disclosed by U.S. Pat. Nos. 3,993,981 entitled "Apparatus For Processing Data Transfer Requests In A Data Processing System", and 4,030,075 entitled "Data Processing Systems Having Distributed Priority Network" and will be described herein only as necessary to provide continuity to the description.

The 18 address leads BSAD05-22 are connected between bus 5 and the junction of the driver 212 and the receiver 213 of bus interface unit 10. The output of receivers 213, 215 and 217 connect to a First-In-First-Out (FIFO) buffer 203. The 20 bit data word lines BSDT A, B, 00-15, BSDP 00, 08 are connected to the junction of the driver 214 and receiver 215. A number of control signal lines are connected to the junction of the driver 218 and the receiver 217. These control logic signals Bus request BSREQT, data cycle now BSDCNN, bus acknowledge BSACKR, bus wait BSWAIT, BSAD 23, second half bus cycle BSSHBC and bus double pull BSDBPL input system bus control 219 through receiver 217 and are distributed to other logic control units which will be described infra as well as being sent out on bus 5 through driver 218.

The My Data Cycle Now logic signal MYDCNN- connects between System Bus Control 219 and drivers 212, 214 and 218.

Signal bus BSAD 08-17, the output of receiver 213, connects to Cycle Control 232 of the Replacement and Update Unit 11. The output of an address register (AOR) 207 18 bit address BAOR 05-22 in the address control unit 13 connects to the input of driver 212. Cache identification code $0002_8$ and function code $00_8$ or $01_8$ are encoded on the input of a driver 214 whose output is connected to the bus 5 data lines BSDT A, B, 00-15. Logic circuit signals described infra are connected between other units of cache 1 and system bus control 219.

The receiver driver pairs 212 and 213, 214 and 215, and 217 and 218 are 26S10 circuits described on page 4-28 of the catalog entitled "Schottky & Low Power Schottky Bipolar Memory, Logic & Interface" Published by Advanced Micro Devices, 901 Thompson Place, Sunnyvale, Calif. 94086.

REPLACEMENT AND UPDATE UNIT 11—FIG. 2, Sheet 3

The replacement and update unit 11 FIG. 2 includes the FIFO buffer 203, a local register (LR)204, buffer bypass drivers 205, FIFO R/W control 230, clock control 220 and cycle control 232.

Replacement and update unit 11 receives from Bus Interface Unit 10 the 18 bit update address BSAD 05-22, the 20 bit data word BSDT A, B, 00-15, BSDP 00, 08 and control signals all of which connect between FIFO 203 and their respective receivers 213, 215 and 217. An 18 line replacement address signal bus AOR 05-22 connects between the input of LR 204 and a replacement address file (RAF)206 output in address control unit 13. Signal busses FIFO 00-17, FIFO 19-38 and FIFO 18, 39-43 connect between the FIFO 203 output and LR 204 input. Also connected between the replacement and update unit 11 and the other units of cache 1 are control signals described infra.

A 20 bit data word signal bus DATA 00-19+ connects between the output of the buffer bypass driver 215 unit and a junction 216 in cache directory and data buffer unit 12. The 18 line update or replacement address signal bus FIFO 00-17+ connect between the output of LR 204 and one input of 2:1 MUX 208, and the 20 bit data output signal lines DATA 00-19− connect between the output of LR 204 and a cache data buffer 201. Read address counter output logic signal FRADDR and FRBDDR connect between FIFO R/W Control 230 and FIFO 203 as do write address counter output FWADDR and FWBDDR and Write Strobe signal FWRITE. Logic signal CYFIFO connects between FIFO R/W control 230, cycle control 232 and LR 204. Logic Signal FIFO 41+ connects between the FIFO bit position 41 output of FIFO 203 and FIFO read enable terminals for FIFO 00-17. Logic Signals FIFO 41− connects between the FIFO bit position 41 output of FIFO 203 and the RAF 206. FIFO 18, 42 and 43 connect between a Read Address Multiplexer 233 and their respective bit position outputs of FIFO 203. Logic Signal MEMREQ connects between cycle control 232, System bus control 219 and a 2:1 MUX 209 switch. CLOCKO+ connects between Clock Control 220, cycle control 232 and other logic units described infra. Logic signal NO HIT+ connects between FIFO R/W control 230, cycle control 232 and NAND 231 of cache directory and data buffer Unit 12. Logic signal REPLACE connects between the LR 204 output, a 2:1 MUX 223 switch and a Round Robin 224 logic unit. Logic signal FEMPTY− connects between FIFO R/W control 230 and Clock Control 220. Logic signal CACHRQ connects between interface 6 and Clock Control 220 and logic signal CYCADN connects to interface 6 from cycle control 232.

FIFO 203 is organized as four 44-bit registers made up of random access memory chips 74LS 670 described on page 7-526 of the TTL Data Book for Design Engineers, second edition, copyright 1976 by Texes Instruments of Dallas, Texas. LR 204 is a 44 bit register made up of conventional flip-flops using conventional design techniques. Address, data and control information are gated by logic signal busses FIFO 00-17, FIFO 19-38 and FIFO 18, 39-43 respectively. FIFO 19-38, the data signal bus is gated through buffer bypass drivers 205 by logic signal INTERG+ going high. Buffer bypass drivers 205 are made up of 74 367 circuits described on page 5-69 of the aforementioned TTL Data Book. FIFO R/W control 230 provides read address counter signals FRADDR and FRBDDR, write address counter signals FWADDR and FWBDDR, and a write strobe FWRITE to select the FIFO 203 registers for reading and writing. A FEMPTY- signal going high indicating that the FIFO buffer is not empty starts CLOCK0+ cycling in clock control 220. A FIFO 41+ signal low indicates that the LR 204 18 bit address field LR 0-17 will be filled from RAF 206 over the 18 line AOR 05-22 signal bus.

The replacement cycle is operative in response to the CPU 2 memory request logic signal CACHRQ. If the requested information is not in cache 1, a request for the information is sent by cache 1 to main memory 3 over bus 5. The requested information coming back from main memory 3 over bus 5 is sent to CPU2 and written into data buffer 201. This operation is called replacement.

Cache 1 reads all information on bus 5 into FIFO 203. If that information was to update main memory 3, then cache 1 checks to see if that main memory 3 address location is stored in the data buffer 201. If the information address location is stored in the data buffer 201, then the data word in that location is updated with the new information data word. This operation is called update. Co-pending related applications 1 and 3 listed supra disclose the replacement and the update operation in more detail.

CACHE DIRECTORY AND DATA BUFFER 12—FIG. 2, sheet 4

The cache directory and data buffer 12 comprises the data buffer 201, the directory 202, 4 comparators 221a-d, the 2:1 MUX 208, a round robin 224 logic unit, a 2:1 MUX 223, 18 inverters 225, 20 NAND gates each of 251a-t, 252a-t, 253a-t, and 254a-t, an AND gate 231 and the junction 216.

Signal busses are coded as follows in the specification and figures. For example, for row address ADDR 00-07-10, ADDR is the signal name. ADDR 00-07 refers to the 8 signal leads labeled ADDR 00, ADDR 01 ... ADDR07. ADDR 00-07— indicates that the signals are low if they indicate a "1" and high if they indicate a "0". ADDR 00-07-10 indicates that this is signal bus 10 of 8 bit row address ADDR 00-07—.

Main memory 3 address BAOR 05-22+ signal lines connect between bus 6 and one input of 2:1 MUX 208 of the cache directory and data buffer unit 12. Address signal lines FIFO 00-17+, connect between the output of LR204 and the other input of 2:1 MUX 208. 2:1 MUX 208 output signal bus ADDR 00-17+ connects to 18 inverters 225 whose output ADDR 00-17-10 splits into row address ADDR 00-07-10 and column address ADDR 08-17-10. Row address ADDR 00-07-10 connects to directory 202 and to one input each of 4 comparators 221a-d. Column address ADDR 08-17-10 connects to the data buffer 201, directory 202 and column address ADDR 08-17+ connects to round robin 224. Row addresses ADDR 00-07-20, -21, -22 and -23 connect to the second input each of 4 comparators 221a-d, logic signals HIT 0-3+ connect to an input of a 2:1 MUX 223 and also to one input each of 20 NAND 251a-t circuits, 20 NAND 252a-t circuits, 20 NAND 253a-t circuits and 20 NAND 254a-t circuits. The round robin 224 output, LEVEL 0-3+ connects to the second input of 2:1 MUX 223. The output of 2:1 MUX 223, the 4 logic signals WRITE 0-3 each connects to their respective level 0-3 of data buffer 201 and Directory 202. The outputs of data buffer 201 20 bit signal busses CADP 00-19 -10, -11, -12 and -13 connect to the second input and logic signal INTERG— connects to the third input of NAND 251a-t, 252a-t, 253a-t and 254a-t whose respective output signal busses CADP 00-19+ connect to junction 216. Data word signal bus CADP 00-19+ connects between junction 216 and interface 6. The output signals HIT 0-3+ connect to the input of NAND 231, the output of which connects to cycle control 232 and FIFO R/W control 230. 2:1 MUX's 208 and 223 are switched by logic signals ADDRSO+ and REPLACE respectively. Logic signal REPLACE connects to round robin 224.

Data buffer 201 is organized in four levels, each level storing 1,024 data words in 1,024 word locations addressed by 10-bit column address ADDR 08-17-10. Four words, one from each level, CADP 00-19-10, -11, -12, and -13 are read out of data buffer 201 when the data buffer 201 is addressed. Directory 202 is also organized in four levels of 1,024 memory locations in each level. Each memory location stores an 8 bit row address. When 10 bit column address ADDR 08-17-10 inputs directory 202, four 8 bit row addresses ADDR 00-07-20, -21, -22 and -23 are read out of the four levels of directory 202 to four comparators 221a-d. These row addresses are compared with the input row address ADDR 00-07-10 and if there is an equal, that "hit" line HIT 0+, HIT 1+, HIT 2+ or HIT 3+ goes high gating the 20 bit output of data buffer 201 through the appropriate 20 circuits of NAND 251a-t, 252a-t, 253a-t or 254a-t to junction 216 and to CPU2.

Round robin 224 has two one bit by 1024 address random access memories (RAM). For each address location, there are stored 2 bits in each RAM which when decoded select the next level of that column address to be replaced.

The directory 202 and data buffer 201 are designed using random access memory chips 93 LS 425 and round robin 224 is designed using random access memory chips 93 415, described on pages 7-119 and 7-70 respectively in the Bipolar Memory Data Book, copyright 1977, by Fairchild Camera and Instrument Co. of Mountain View, Calif. Comparator 221a-d logic circuits are made up of Fairchild TTL/MSI 93S47 high speed 6 bit identity comparator circuits. 2:1 MUX 208 and 223 are 75S157 logic circuits described on page 7-181 of the aforementioned TTL Data Book. The round robin 224 operation is described in copending related application No. 2 listed supra.

ADDRESS CONTROL UNIT 13—FIG. 2, sheet 2

Address control unit 13 includes the address register AOR 207, the replacement address file RAF 206, an adder 211, an AND gate 236, an EXCLUSIVE OR gate 237, a 2:1 MUX 209, the read address multiplexer 233, a write address counter 234, and an AOR and RAF control unit 235. CPU2 address signal lines BAOR 05-22+ connect between interface 6 and one input of 2:1 MUX 209. Logic signal MEMREQ connects between cycle control 232 and the select terminal of 2:1 MUX 209. The output of adder 211 signal lines AOR 05-22+ connects to the other input of 2:1 MUX 209 whose output signal lines BAOR 05-22 connects to the inputs of AOR 207 and RAF 206. Signal bus BAOR 05-22+10 connects between the output of AOR 207 and the inputs to adder 211 and driver 212. AOR 207 is organized as an 18 bit register made up of conventional flip-flops. RAF 206 is organized as four 18 bit registers and is designed using the aforementioned random access memory chips 74 LS 670. The logic signals ADDRR0 and ADDRR1 connect between the write address counter 234 and RAF 206, AOR and RAF control 235, AND gate 236 and EXCLUSIVE OR gate 237. The outputs of AND 236 and EXCLUSIVE OR 237 connect to the +2 and +1 terminals respectively of adder 211. Logic signals ADDRWD+0B and ADDRWD+0A connect between the read address multiplexer 233 and RAF 206. An AORCNT logic signal connects between AOR and RAF control 235 and write address counter 234. Logic signals BAWRIT and BAORCK connect between AOR and RAF control 235 and RAF 206 and AOR 207 respectively.

Figure 8:
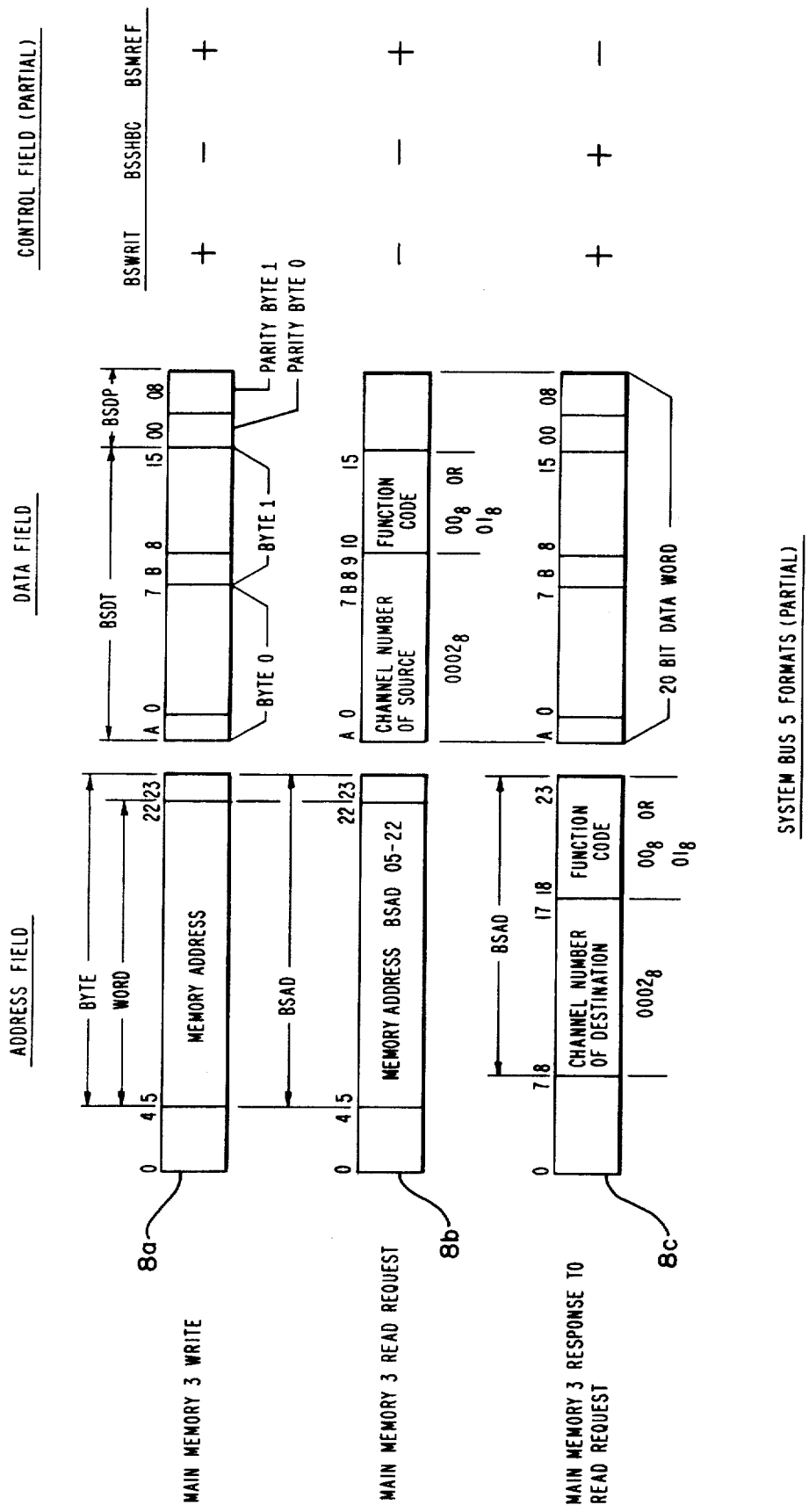
FIG. 8 shows the system bus formats.

For the interleaved memory operation the address control unit 13 logic loads AOR 207 with PRA, the CPU memory request address to send out on bus 5 to main memory 3 in a format of FIG. 8b during a first memory request cycle. AOR 207 is then loaded with PRA+1 which is the memory request address sent out on bus 5 to main memory 3 in the format 8b of FIG. 8 during the second memory request cycle. RAF 206 is loaded with PRA, PRA+1, PRA+2 and PRA+3 in successive locations under control of write address counter 234, adder 211 and AOR and RAF control 235. These addresses are supplied to the address field of LR 204 when information in the format 8c of FIG. 8 are sent from main memory 3 to cache 1 over bus 5. For the banked memory operation, the address control unit 13 logic loads AOR 207 with PRA, the CPU2 memory request address which is sent out on bus 5 to main memory 3 in the format 8b of FIG. 8 during the memory request cycle. RAF 206 is loaded with PRA and PRA+1 in successive locations under control of the write address counter 234. These addresses are supplied to the address field of LR204 when information in the format 8c of FIG. 8 are sent from main memory 3 to cache 1 over bus 5. The read address multiplexer 233 selects the RAF 206 address location to be read out of LR 204 for each main memory 3 response over bus 5 to the read request of cache 1. The adder 211 output signal lines AORO 05-22+ provide the address stored in AOR 207 incremented by +1 or +2 under control of AND 236 and 237. If the write address counter 234 is set at location 03, logic signals ADDRR0+ and ADDRR1+ are high, therefore AND 236 enables the +2 input of adder 211. If the write address counter is set at locations 01 or 02 then the output of EXCLUSIVE OR 237 enables the +1 input to adder 211. The adder 211 is a 74 283 logic circuit described on page 7-415 of the aforementioned TTL Data Book.

CACHE CPU INTERFACE UNIT 6

Cache CPU Interface Unit 6 includes an 18 line address signal bus BAOR 05-22, a 20 line data signal bus CADP00-19 and a control signal bus containing a number of signal lines. The functions of the control signal lines CACHRQ, the cache request logic signal, and CYCADN, the cache done logic signal, are described herein. Cache CPU interface unit 6 is fully described in copending related Application No. 8 listed supra.

SYSTEM BUS 5 CONTROL SIGNALS

The signals listed below are the bus 5 control signals necessary to describe the invention. The aforementioned U.S. Patent references fully describe all of the control signals associated with bus 5.

Memory Reference (BSMREF)

BSMREF high indicates that the address loads BSAD 05-22 contain a memory 3 word address.

BSMREF low indicates that the address leads BSAD 08-23 contain a channel address and a function code.

Bus Write (BSWRIT)

BSWRIT high indicates that a master unit is requesting a slave unit to execute a write cycle.

Second Half Bus Cycle (BSSHBC)

BSSHBC high indicates that main memory 3 is sending to cache 1 information previously requested by cache 1.

Double Pull (BSDBPL)

BSDBPL is high when sent from cache 1 to main memory 3 to signal main memory 3 to read data in double pull mode.

BSDBPL is high when sent from main memory 3 to cache 1 with the first word of a two word response to a memory request.

BSDBPL is low when sent from main memory 3 to cache 1 with the second word of a two word response to the memory request.

This enables main memory 3 to send one or two words to cache. If, for example, PRA is the high order address of a memory bank then BSDBPL will be low indicating that only one word will be transferred in response to the memory request.

My Acknowledge (MYACKR)

MYACKR when high is sent by cache 1 to system bus 5 to indicate that cache 1 is accepting a system bus 5 data word transfer from main memory 3.

My Bus Request (MYREQT)

MYREQT when high is set by cache 1 to system bus 5 to indicate that cache 1 is requesting a system bus 5 cycle.

My Data Cycle Now (MYDCNN)

MYDCNN high indicates that cache 1 is transferring information over system bus 5 to main memory 3.

Data Cycle Now (BSDCNN)

BSDCNN high indicates that main memory 3 has placed information on the bus 5 for use by cache 1.

Acknowledge (BSACKR)

BSACKR high indicates to cache 1 that main memory 3 has accepted the memory request sent by cache 1.

Wait (BSWAIT)

BSWAIT high indicates to cache 1 that main memory 3 is busy and cannot accept the memory request at this time.

Bus Request (BSREQT)

BSREQT high indicates to cache 1 that a system coupled to bus 5 has requested a bus cycle.

Byte Mode (BSBYTE)

BSBYTE high indicates a byte transfer rather than a word transfer.

CLOCK CONTROL 220—FIG. 3, Sheet 2

The cache request logic signal CACHRQ, FIG. 3, connects to a RESET terminal of a flop 301 and to an input terminal of a NAND 302. A clock signal CLOCK0+ connects to the CLK terminal of flop 301. The $\overline{Q}$ output of flop 301 connects to the second input of NAND 302. The CPUREQ+0A output of a NAND 306 connects to the third input of NAND 302 whose output connects to an input of 30 ns delay line 303 and an input of NAND 304. The output of delay line 303 connects to the other input of NAND 364. The Q output of flop 301, logic signal BLKREQ+ connects to a D and RESET input of flop 305. The logic "1" signal connects to the SET input of flop 305. A MYACKR logic signal connects to the CLK input of flop 305. The Q output signal INTERG+ connects to buffer bypass drivers 205 and the $\overline{Q}$ output signal INTERG− connects to the input of the HIT0-3+ NAND gates 251a–t, 252a–t, 253a–t and 254a–t in the cache directory and data buffer unit 12. Logic signal FEMPTY-20 connects to an input of AND 324 and to the input of inverter 307. A logic signal MEMREQ connects to an input of NAND 306. A logic signal ADDRSO-, the $\overline{Q}$ output of flop 309 connects to another input of NAND 306. Logic signal CYQLTO+ connects between cycle control 232 and the third input of NAND 306. Logic signal ADDRSO+, the Q output of flop 309 connects to the select input of 2:1 MUX 208 in cache directory and data buffer unit 12. The output of NAND 308 connects to the SET terminal, CLOCK0+ connects to the CLK terminal and a general clear CLEAR signal connects to the reset terminal of flop 309. Logic signals CYFIFO+0A and CYWRIT+0A connect to respective inputs of NAND 308. The CPUREQ logic signal connects to the NAND 304 output to a SFT terminal of flop 313. An FEMPTY- logic signal connects to a RESET terminal of flop 313 from an inverter 319 output. A $\overline{Q}$ output terminal logic signal FEMTPY+20 and a Q output logic signal FEMPTY-20 of flop 313 connect to the respective input of a NOR 310. A CYREAD logic signal connects between the Q output of a flop 330 and the third input of NOR 310 and CLOCK0+ connects to the fourth input of NOR 310. The output of NOR 310 connects to an input of NOR 311. The CLOCK0+ connects to an inverter 312 input. A CLOCK0− input signal of inverter 312 connects to an input of NAND 315.

Clock control 220 provides a timing signal CLOCK0+ to time the logic circuits of cache 1. CLOCK0+ starts cycling on either a CPU2 memory request or by FIFO 203 being loaded with information from bus 5. In the case of the CPU2 memory request, logic signal CACHRQ, the input to NAND 302 is forced high, which sets the output low. The other two inputs to NAND 302 BLKREQ− and CPUREQ+0A are high at this time. Flop 301 is not set so the $\overline{Q}$ output is high and both inputs to NAND 306 are low so the output is high. When the output of NAND 302 goes low, one input of NAND 304 goes low and 30 nanoseconds later the other input goes low due to the delay in delay line 303. The delayed signal low sets logic signal CPUREQ high. Logic signal CPUREQ the SET input of flop 313 high sets the Q output FEMPTY-20 low. Flop 313 is a 74S74 logic circuit which has both the Q and $\overline{Q}$ outputs high when both the SET and PRESET inputs are low. Flop 74S74 is described on page 5-22 of the aforementioned TTL Data Book.

The logic signal FEMPTY-20 low sets the output of NOR 310 high forcing the timing signal CLOCK0+ output of NOR 311 low. Fifty nanoseconds later, the output of delay line 314 forces the other input of NOR 311 low forcing timing signal CLOCK0+ high. Timing signal CLOCK0+ going high sets flop 301 setting the $\overline{Q}$ output logic signal BLKREQ− low. This forces the output of NAND 302 high forcing the NAND 304 output logic signal CPUREQ, the SET input to flop 313, low. This sets flop 313 and logic signal FEMPTY-20 is forced high keeping the timing signal CLOCK0+ output of NOR 311 high. Timing signal CLOCK0+ remains high as long as logic signal CACHRQ remains high. Logic signal CACHRQ will remain high until CPU2 receives the requested data word and the cache done logic signal CYCADN is sent to CPU2.

Flop 313 which controls the start of cycling of CLOCK0+ is also controlled by the loading FIFO 205. The write address counter flops 316 and 317 in FIFO R/W control 230 advance to the next location after receiving acknowledged information from bus 5 (BSACKR high). This sets the output of comparator 318, logic signal FEMPTY+ low, setting the inverter 319 output logic signal FEMPTY− high. With the RESET input logic signal FEMPTY− of flop 313 high, the $\overline{Q}$ output logic signal FEMPTY+20 goes low starting the timing signal CLOCK0+ cycling as before. In this case, timing signal CLOCK0+ cycles as long as there is information in FIFO 203, and logic signal FEMPTY− keeps going low and logic signal CYREAD the input to NOR 310 is low. CPUREQ+0A output logic signal from NAND 306 stays low as long as the MEMREQ or ADDRS0− inputs to NAND 306 are high. This prevents a second CPU2 memory request cycle if logic signal CACHRQ is again high until the responses to the main memory 3 requests as a result of a previous CPU2 memory request is sent to cache 1. MYACKR logic signal going high at the start of the main memory 3 response to the CPU2 memory request sets flop 305, setting logic signal INTERG+ high to gate buffer bypass drivers 205 to send the CPU2 requested data (PRA) directly out on interface 6. INTERG− when high gates NAND 251a–t, 252a–t, 253a–t and 254a–t in cache directory and data buffer 12 to allow the selected word from data buffer 201 to be sent to CPU2 if the data word was stored in data buffer 201 when logic signal CACHRQ was set high. The logic signal FEMPTY+30 input to the SET terminal of flop 301 assures that the flop 301 does not set when logic signal CACHRQ comes high during a FIFO 203 cycle. Flops 301, 305 and 313 are 74S74 logic circuits described on page 5-22 of the aforementioned TTL Data Book. Flop 309 is a 74S175 logic circuit described on page 5-46 of the TTL Data Book.

DETAILED DESCRIPTION OF FIFO R/W
CONTROL 230—FIG. 3, Sheets 1 & 2

In FIG. 3, the output of a NAND 324 connects to the SET input, a general clear signal CLEAR connects to the RESET input and timing signal CLOCK0+ connects to the CLK input of a flop 323. The Q output logic signal CYFIFO connects to a NAND 315 input. Timing signal CLOCK0− connects between the inverter 312 output and the other input of NAND 315. The Q output, logic signal CYFIFO also connects to cycle control 232. The $\overline{Q}$ output connects to the input of AND 324. Logic signal FEMPTY−20 connects to the other input of AND 324. A BUMPUP logic signal output of NAND 315 connects to the CLK inputs, and CLEAR connects to the RESET inputs of flops 316 and 317. The logic "1" signals connect to the J, K and PRESET inputs of flop 316, and the PRESET input of flop 317. The Q output of flop 316 connects to the J and K inputs of flop 317 and to a comparator 318 input. The Q output of flop 317 connects to comparator 318. The $\overline{Q}$ outputs of flop 316 and 317 connect to the read address select terminals of FIFO 203. A MYACKR+ logic signal and a BSSHBC logic signal connect to NAND 322 whose output, logic signal F plus 1 connects to the CLK inputs of flops 320 and 321. CLEAR logic signals connect to the RESET inputs of flops 320 and 321. Logic "1" signals connect to the J, K and PRESET inputs of flop 320 and the PRESET input of flop 321. The Q output of flop 320 connects to comparator 318 and the J and K input of flop 321. The Q output of flop 321 connects to comparator 318. The $\overline{Q}$ outputs of flops 320 and 321 connect to the write address select terminals of FIFO 203. FIFO 41+ logic signal connects to the read enable terminals of address field FIFO bit positions 00-17 of FIFO 203. A ground signal connects to the read enable terminals of the data and control field FIFO bit positions 18-43 of FIFO 203. FIFO 41+ connects to the SET input of LR 204 replace-update bit position 41 flop. Logic signals CYFIFO, REPLACE and NOHIT+ connect to input terminals of NOR 325 whose output connects to a NOR 327, whose output logic signal CYWRIT+DA connects to the SET input of flop 330 and an input of NAND 308. Timing signal CLOCK0+ connects to the CLK terminal, and CLEAR connects to the RESET terminal of flop 330 whose $\overline{Q}$ output logic signal CYREAD connects to round robin 224 and an input to NOR 310. Logic signal BSDCNN+ connects to the input of an inverter 326 whose output connects to the inputs of delay lines 328 and 329. Delay line 328 output connects to an input of inverter 331 whose output connects to an input of NAND 332. The output of delay line 329 connects to the other input of NAND 332 whose output logic signal FWRITE connects to the write enable terminal of FIFO 203. Logic signal NOHIT+ connects to an input of inverter 334 whose output logic signal NOHIT− connects to an input of NOR 333 whose output connects to the other input of NOR 327. Logic signals CYFIFO and UPDATE connect to the other inputs of NOR 333.

Logic signal BSDCNN+ goes high at the start of every main memory 3 to cache 1 data transfer cycle, is inverted by inverter 326, is delayed 10 nanoseconds by delay line 328 and, is again inverted by inverter 331 appearing at the first input of NAND 332 as a delayed positive logic signal. The output of delay line 329 is a negative going logic signal appearing at the second input of NAND 332 delayed 40 nanoseconds. The 2 inputs to NAND 332 are positive for 30 nanoseconds forcing the FWRITE write enable input to a negative going pulse 30 nanoseconds wide, delayed 10 nanoseconds from the rise of BSDCNN+. This strobes the bus 5 information at the output of receivers 213, 215 and 217 into a location of FIFO 203 defined by the $\overline{Q}$ outputs of the write address flops 320 and 321 logic signals FWADDR− and FWBDDR−. MYACKR goes high, if a cache identification AND 546 output, FIG. 5, goes high indicating that cache ID 0002₈ was received from bus 5 through receiver 213 and that this is not a main memory 3 write operation. When BSDCNN+ delayed 60 nanoseconds goes high, flop 516 sets and logic signal MYACKR, the input to NAND 322 goes high. Since this is a response to a memory request, BSSHBC is high forcing the output of NAND 322 logic signal F PLUS 1 low. Forcing the CLK inputs of flops 320 and 321 low increments the write address counter flops 320 and 321. Since the output logic signals FWADDR+ and FWBDDR+, of the write address counter flops 320 and 321 and logic signals FRADDR+ and FRBDDR+, outputs of the read address counter flops 316 and 317 are no longer equal, logic signal FEMPTY+, the output of comparator 318 goes low, starting CLOCK0+ cycles as previously described in Clock Control 220.

Write address counter flops 320 and 321 and read address counter flops 316 and 317 are conventional JK flops 74S112 described on page 5-24 of the aforementioned TTL Data Book and they operate in the following manner. Assume flops 320 and 321 are both reset, that is the $\overline{Q}$ outputs FWADDR− and FWBDDR− are high. When FPLUS 1 goes low, flop 320 sets on the fall of logic signal FPLUS 1. The Q output of flop 320 being low keeps flop 321 reset. With flop 320 set and its Q output high, flop 320 resets and flop 321 sets on the next fall of logic signal FPLUS 1. On the next fall of logic signal FPLUS 1, both flops 320 and 321 are set and on the fourth fall of logic signal FPLUS 1, both flops are reset. The rise of CLOCK0+ sets flop 323 and its Q output, logic signal CYFIFO goes high. When CLOCK0+ next goes low, both logic signals CYFIFO and CLOCK0− input to NAND 315, go high forcing the output logic signal BUMPUP low, advancing the read address counter flops 316 and 317. The inputs to comparator 318 signals FWADDR+ and FWBDDR+ equals signals FRADDR+ and FRBDDR+, thereby setting FEMPTY+ high. This stops timing signal CLOCK0+ if no bus 5 cycle logic signal BSDCNN+ is present. Logic signal FEMPTY+ is inverted by inverter 319 and the output logic signal FEMPTY− going low sets the FEMPTY+20 output of flop 313 high, forcing the output of NOR 310 low, forcing the CLOCK0+ output of NOR 311 high. Logic signal CYFIFO, FIG. 2, going high sets the FIFO 203 output of the location indicated by the read address counter flops 316 and 317 (FRADDR− and FRBDDR−) into LR 204. If the information in FIFO 203 was a response to a memory request, FIFO 41+ is high. This sets LR 204, F/F 41, FIG. 3, so that its Q output, logic signal REPLACE is high. If logic signals REPLACE, CYFIFO and NOHIT+, the inputs to NOR 325 are high, its output is low setting the output of inverter 327 high, so that at the next rise of CLOCK0+, flop 330 sets and the $\overline{Q}$ output logic signal CYREAD goes low indicating that this is a cache write cycle. Flop 309 of clock control 220 was previously set since CYWRITE+0A and CYFIFO+0A were low in previous cycles setting the Q output ADDRS0+ high, switching 2:1 MUX 208 FIG. 2, to receive memory address BAOR 05-22+. At the rise of CLOCK0+, logic signal CYFIFO+0A is high, since flop 323 is not set and the $\overline{Q}$ output which is high inputs AND 324. The FEMPTY-20 input to AND 324 is also high, forcing the CYFIFO+0A input to NAND 308 high, setting the output low. Since the SET input to flow 309 is low, the Q output ADDRS0+ goes low, switching 2:1 MUX 208, FIG. 2, to receive the FIFO 00-17+ address output from LR 204. Flop 323 when set is reset on the next rise of CLOCK0+ since the $\overline{Q}$ output which inputs AND 324 is low, forcing the SET input of flop 323 low, resetting flop 323 and the Q output logic signal CYFIFO goes low. Inverter 334 and NOR 333 are not necessary to describe this invention. Their contribution to the logic will be described in copending application 1 and 3 listed supra.

Flops 323 and 330 are 74S175 logic circuits described on page 5-46 of the aforementioned TTL Data Book.

DETAILED DESCRIPTION OF AOR AND RAF CONTROL 235

FIG. 4, SHEET 1

READ ADDRESS MULTIPLEXER 223 AND WRITE ADDRESS COUNTER 234

FIG. 4, SHEET 2

The outputs of a NAND 417 and 418 connects to NOR 419 inputs. Logic signal BLOCKF connects between a NAND 417 and cycle control 232. Logic signal FEMPTY-20 connects between clock control 220 and the 3rd input of NOR 419 whose output logic signal AORCNT connects to the inputs of delay lines 420 and 421, an input of a NAND 424 and an input to a NAND 416. The output of NAND 424 logic signal BAORCK connects to AOR 207. The delay line 421 output connects to an inverter 423 input whose output logic signal AORCNT-30 connects to the CLK inputs of flops 426 and 427. The delay line 420 output connects to an inverter 422 input whose output connects to inputs of NAND 416 and NAND 424. Logic signal BAWRIT connects between the output of NAND 416, the input of NAND 425, and the WRITE strobe terminal of RAF 206. Logic signal MEMREQ connects to a NAND 425 input, the RESET input flops 412 and 413 and cycle control 232. The output of NAND 425 connects to the reset terminals of flops 426 and 427. Logic "1" signals connect to the PRESET inputs of flops 426 and 427 and the J and K inputs of flop 427. The Q output of flop 426, logic signal ADDRRO+, connects to the Write Address terminal 2 of RAF 206 and connects to the input of NAND 418. Logic signal MYACKR connects between another input of NAND 418 and cycle control 232. The $\overline{Q}$ output of flop 426 logic signal ADDRRO— connects to inputs of NAND 417 and NAND 424. The Q output of flop 427, logic signal ADDRRI+ connects to the Write Address terminal 1 of RAF 206 and the input of NAND 417 Logic signal BSDCND+ connects between cycle control 232 and the CLK terminal of a flop 409. Logic signal BSAD 23+ connects to the SET input of flop 409 and the output of Receiver 217. Logic signal MYACKD connects between cycle control 232 and input of NAND 410 and 411. The Q output of flop 409, logic signal BSAD 23+10, connects to the other input of NAND 410. The $\overline{Q}$ output of flop 409, logic signal BSAD 23-10, connects to the other input of NAND 411. The output of NAND 410 connects to the CLK terminal of flop 412 and the output of NAND 411 connects to the CLK terminal of flop 413. Logic "1" signal connects to the PRESET, J and K terminals of flops 412 and 413. The Q output of flop 412, logic signal FCHONE+ connects to the input of FIFO bit position 43 of FIFO 203, FIG. 4. The Q output of flop 413, logic signal FCHZRO+, connects to the input of the FIFO bit position 42 of FIFO 203. Logic signal BSAD23+ connects to the input of the FIFO bit position 18 of FIFO 203. The output of the FIFO bit position 18 connects to a select terminal 1 of MUX 414 and 415. The MUX's are 74 S153 dual 4 lines to 1 line Data Selectors/Multiplexers described on page 5-42 of the aforementioned TTL Data Book. Terminal 1 of a Banked-interleaved select switch 407 is connected to ground. Terminal 2 is connected to logic "1". Logic signal BANKED+00 connects between terminal 3 and an input to inverter 408 whose output logic signal ADDRWD+ connects to select terminal 2 of 4:1 MUX 414 and 415. Logic signal BANKED+00 also connects to cycle control 232. The enable input and the terminal 2 input of 4:1 MUX 414 are connected to ground as is the enable input and the terminal 0 input of 4:1 MUX 415. Input 3 of 4:1 MUX 414 and input 1 of 4:1 MUX 415 are connected to logic "1". Input 0 of 4:1 MUX 414 and input 2 of 4:1 MUX 415 connect to the FIFO bit position 42 output of FIFO 203 and input 1 of 4:1 MUX 414 and input 3 of 4:1 MUX 415 connects to the FIFO bit position 42 output of FIFO 203. The outputs of MUX 414 and 415, logic signals ADDRWD+0B and ADDRWD+0A connect to the Read Address terminals 1 and 2 respectively of RAF 206 and also connect to cycle control 232. Logic signal FIFO 41— connects to the read enable input of RAF 206. Logic signal BSDCNB+ connects between the RESET input of flop 409 and cycle control 232.

When CACHRQ, FIG. 3, goes high indicating that CPU2 is requesting a data word and CPU2 also sends the main memory 3 address location BAOR 05-22+, FIG. 2, of the requested data word, the address BAOR 05-22 (PRA) appears at the inputs of AOR 207 and location 00 of RAF 206. In addition, the address is sent to directory 202 and data buffer 201 as row address ADDR00-07-10 and column address ADDR 08-17-10. 2:1 MUX 208 is switched by ADDRSO+ high to input BAOR 05-22+ and a directory 202 search is started. When FEMPTY-20, the output of flop 313, FIG. 3, goes low the AORCNT output of NOR 419, FIG. 4, goes high, setting one input to NAND 416 and 424 high. Since the other inputs to NAND 416 and 424 are high logic signals BAWRIT and BAORCK go low. 50 nanoseconds later the output of delay line 420 goes high setting the output of inverter 422 low, setting the outputs of NAND 416 and 424 logic signals BAWRIT and BAORCK high. PRA is strobed into AOR 207 and into location 00 of RAF 206 when BAWRIT and BAORCK are low. Logic signal AORCNT going high is delayed 70 nanoseconds by delay line 421 and is inverted by inverter 423. Inverter 423 output logic signal AORCNT-30 going low advances Write Address Counter 234 to location 01. The Write Address Counter is made up of JK flops 426 and 427 whose operation has been described supra. Logic signal ADDRRI+ is now high and ADDRRO+ is low setting the Write Address in RAF 206 to location 01. Assuming the data requested by CPU2 of Cache 1 is not stored in Cache 1 then MEMREQ+, FIG. 5, is forced high. In FIG. 2, MEMREQ high transfers the 2:1 MUX 209 to receive the AORO05-22+ output of ADDER 211. Since logic signal ADDRR1+ is high and logic signal ADDRRO+ is low, the +1 output of EXCLUSIVE OR 237 is high forcing PRA+1 on the address signal lines AORO 05-22+ and on the 2:1 MUX 209 output signal lines BAOR 05-22.

For both banked and interleaved memories the first memory request is sent to main memory 3 over bus 5 and an acknowledge signal BSACKR returned by main memory 3 to cache 1 over bus 5 sets logic signal BLOCKF+ high, FIG. 5. When BLOCKF+ goes high the 3 inputs to NAND 417, FIG. 4, are high setting the output low. This sets the output of NOR 419 logic signal AORCNT high, which sets logic signal BAWRIT, the RAF 206 write strobe, and logic signal BAORCK, the AOR 207 strobe, low as described supra, setting PRA+1 into AOR 207 and Location 01 of RAF 206. Logic signal AORCNT-30 going low as before advances the write address counter 234 to Location 02. For Location 01 logic signal ADDRRI+ is set high and logic signal ADDRO+ is set low. The fall of logic signal AORCNT-30 sets logic signal ADDRRO+ high and sets ADDRRI+ low and the Write Address Counter 234 addresses Location 02. The banked memory system now awaits the main memory 3 response to the first memory request whereas the interleaved memory system sends a second memory request.

At the end of the second memory request cycle logic signal MYACKR+, FIG. 5, goes high to start the first main memory 3 to cache 1 data response cycle. Since logic signal ADDRRO+ is also high the output of NAND 418 goes low setting logic signal AORCNT, the output of NOR 419 high. As previously described, logic signal BAWRIT goes low setting PRA+2 into location 02 of RAF. In FIG. 2, PRA+1 remains stored in AOR 207. When the Write Address Counter 234 is set at location 02 the output logic signals ADDRRO+ high and ADDRRI+ low results in the +1 output from EXCLUSIVE OR 236 going high. This results in forcing the output of ADDER 211, PRA+2, on the address signal line, AORO 05-22+ and BAOR 05-22, the output of 2:1 MUX 209. Note that logic signal BAORCK the write strobe for AOR 207 is not set low since the logic signal ADDRRO− input to NAND 424 is low. The Write Address Counter 234 is advanced to location 03 when AORCNT-30 goes low as described supra and logic signals, ADDRRO+ and ADDRRI+ are both set high. This results in the +2 output of AND 236, FIG. 2, going high which sets the output of ADDER 211 to PRA+3. Logic signal MYACKR again comes high at the start of the second main memory 3 to cache 1 data word cycle in response to the first memory request again forcing logic signal AORCNT high. This forces logic signal BAWRIT low thereby forcing PRA+3 into location 03 of RAF 206 and advancing the Write Address Counter 234 to location 00.

For an interleaved memory 4 data words are transferred from main memory 3 to cache 1 over bus 5 on 4 separate bus 5 cycles. FIG. 8c shows the format of the responses. The low order bit BSAD23 of the Function Code identifies whether the data word is in response to the first memory request or the second memory request for data words. Logic signal BSAD 23+ and the Function Code history flops 412 and 413 identify the location of RAF 206 that stores the main memory 3 address for the data word being transferred. The first data word is at the PRA main memory 3 location and transfers from main memory 3 cache 1 with the Function Code set to $00_8$. BSAD 23+ the low order bit of Function Code $00_8$ is low and sets into FIFO bit position 18 of FIFO 203 FIG. 2, when the FIFO strobe FWRITE− goes low. Also, at this time the function history flops 412 and 413 are not set and the output logic signals FCHZRO+ and FCHONE+ are low setting the FIFO 42 and FIFO 43 bit positions low. With Switch 407 set to interleaved, the input to inverter 408 logic signal BANKED is low setting the output logic signal ADDRWD+ high, setting the SELECT terminal 2 high. This sets the 2 and 3 input terminals of 4:1 MUX 414 and 415 active. FIFO 18 sets SELECT terminal 1 of 4:1 MUX 414 and 415 low setting input 2 active. Since FIFO 42 is low the outputs of 4:1 MUX 414 and 415 logic signals ADDRWD+OB and ADDRWD+OA are low which set the read address of RAF 206 to location 00 and PRA appears on address signal lines AORO 05-22, FIG. 2, and is strobed into LR 204 when logic signal CYFIFO goes high. BSAD 23+ is low the $\overline{Q}$ output which inputs NAND 411 goes high. When logic signal MYACKD, the input of NAND 411 goes high the output of NAND 411 goes low setting flop 413 with the Q output logic signal FCHZRO+ forcing the FIFO bit position 42 of FIFO 203 high.

On the next bus 5 cycle the data word PRA+2 location in main memory 3 is transferred to cache 1 and the Function Code on bus 5 signal lines BSAD 18-23 is still 00 and BSAD 23+ the low order bit is low. In this case, in FIG. 4, FIFO bit position 18 of FIFO 203 is set low and FIFO bit position 42 is high, since flop 413 is set with the Q output logic signal FCHRZO+ high. The outputs of 4:1 MUX 414 and 415, logic signal ADDRWD+OB is low and logic signal ADDRWD+OA is high since the 2 input terminal of 4:1 MUX 414 is logical ZERO and the 2 input terminal of 4:1 MUX 415 is a logical ONE, thereby resulting in the readout of location 02 of RAF 206 which has the PRA+2 address stored.

The third data word transfer cycle over bus 5 brings the data word from the PRA+1 main memory 3 location with a Function Code of $01_8$. In this case, BSAD 23+ is high and FIFO bit position 18 of FIFO 203, FIG. 4, is high setting the 3 input terminal of 4:1 MUX 414 and 415 active. FIFO bit position 43 is low and FIFO bit position 42 is a "don't care". In this case with FIFO 18 high the ADDRWD+OB output of flop 414 is high and the ADDRWD+OA output of flop 415 is low reading out from RAF 206 location 01 which contains PRA+1. BSAD 23 high causes flop 409 to set when logic signal BSDCND+ goes high, setting the Q output logic signal BSAD23+10 high forcing the output of NAND 410 low when logic signal MYACKD+ goes high. This sets flop 412 and its Q output logic signal FCHONE+ goes high. The 4th bus 5 cycle bringing the data word from the PRA+3 location in main memory 3 has a Function Code of 01. BSAD 23 high as before sets FIFO bit position 18 high and FIFO bit position 43 is set high since logic signal FCHONE+ is high.

The output of 4:1 MuX 414 and 415 logic signals ADDRWD+OB and ADDRWD+OA are high reading out RAF 206 location 03 which stores PRA+3. Flops 412 and 413 are reset when logic signal MEMREQ+ goes low.

For a banked memory, two data words are transferred from main memory 3 to cache 1 over bus 5 on two separate bus 5 cycles. In this case, switch 407 is set to terminal 2 (banked), setting the input of inverter 408 high, forcing the output logic signal ADDRWD+ low. Also, for the banked memory, the function code is $00_8$ as the response to the memory request. Therefore, BSAD23+ is low for both data words sent to cache 1 from main memory 3 over bus 5. FIFO bit position 18 of FIFO 23 is therefore low for both data words. The select inputs of 4:1 MUX 414 and 415 of terminals 1 and 2 are both low thereby activating input terminal 0. When the first data word is read into FIFO 203 from bus 5, logic signals ADDRWD+OB and ADDRWD+OA are both low and PRA stored in location 00 is read out of RAF 206. Then, when logic signal MYACKD is forced high, the output of NAND 411 goes low, setting flop 413. BSAD23-10 $\overline{Q}$ the output of flop 409 is high at this time. The Q output FCHZRO+ flop 413 high is stored in FIFO bit position 42 on the next FWRITE enable pulse of FIFO 203. This forces the output of 4:1 MUX 414 ADDRWD+OB high, so that the address in RAF 206 location 01 (PRA+1) is transferred to LR 204 with the second data word in response to the memory request.

Flops 412, 413, 426 and 427 are 74S112 logic circuits described on page 5-34 and flop 409 is a 74S175 logic circuit described on page 5-46 of the aforementioned TTL Data Book.

DETAILED DESCRIPTION OF CYCLE CONTROL 232-FIG. 5, Sheets 1 & 2

Logic signals MYACKD, BSDBPL, BSWAIT, MYDCNN+, MEMREQ+, BSDCND−, BSACKR and CLRREQ connect to system bus control 219. MEMREQ+ also connects to AOR and RAF control 235 and 2:1 MUX 209. Logic signals CYFIFO, CYREAD+ and FEMPTY+30 connect to FIFO R/W control 230. Logic signal NO HIT+ connects to directory 202. Logic signal MYACKD connects to an input of NAND 516 and BSDBPL connects to the other input of NAND 516 whose output connects to an input of OR 507 whose output, logic signal DATACK− connects to the CLOCK inputs of flops 508 and 509. Logic signal BSWAIT connects to an input of NAND 505 and MYDCNN+ connects to the other input of NAND 505 and a SET input to flop 504. Logic signal BLOCKF+ connects between the Q output of flop 504 and the other input to NAND 505 whose output connects to the other input of OR 507. Logic signal BSACKR connects to the CLOCK input of flop 504 whose $\overline{Q}$ output logic signal BLOCKF− connects to an input to NOR 536 and an input of AND 512. Logic signals NOHIT+, CYREAD and FEMPTY+30 connect to the inputs of NOR 501 whose output connects to an input of NOR 502 whose output connects to the SET input of flop 503. The $\overline{Q}$ output of flop 503, logic signal MEMREQ− connects to the other input of NOR 502. The CLOCKO+ signal connects to the CLK input of flop 503 whose Q output logic signal MEMREQ+ connects to the RESET inputs of flops 508, 509 and 504 and the CLK input of flop 511. Logic "1" connects to the SET input of flop 508 whose output, logic signal DATCTO, connects to the SET input of flop 508 whose output, logic signal DATCTI, connects to an input of NAND 510 whose output logic signal MEMREQ RESET, connects to the RESET input of flop 503.

Logic signals ADDRWD+OA and ADDRW+OB connect to the inputs of their respective inverters 523 and 524 whose outputs, logic signals ADDRWD-OA and ADDRWD-OB connect to the inputs of AND 533 whose output connects to an input of NOR 527. FIFO41+ connects to another input of NOR 527. Logic signal FEMPTY+30 connects to inputs of NOR 526 and Inverter 534 whose output logic signal FEMPTY-30 connects to another input of NOR 527. Logic signal CYREAD connects to inputs of NOR 526 and 527. Logic signal NOHIT+ connects to an inverter 525 input whose output logic signal CAHIT connects to an input of NOR 526. The outputs of NOR 526 and 527 connect to their respective inputs of NOR 528 whose output connects to the D input of flop 529. The Q output of flop 529 logic signal CYCADN+, connects to inputs of inverters 520 and 532. The output of Inverter 530 connects to the input of Delay line 531 whose output connects to the RESET terminal of flop 529. The output of Inverter 532 is logic signal CYCADN− connects to cache CPU interface unit 6. CLOCKO+ connects to the CLK input of flop 509. Logic signal BANKED+OO connects between AOR and RAF control 235 and an input of inverter 537 whose output connects to the input of NOR 536 and the PRESET input of flop 508. CYFIFO connects to the other input of NAND 510.

During the first memory request cycle flop 503 sets on the rise of CLOCKO+ if the CPU2 requested address PRA is not stored in the directory 202. The output of NAND 231, FIG. 2, logic signal NO HIT+ is high forcing the output of NOR 501, FIG. 5, low, forcing the output of NOR 502 high setting flop 503. The Q output logic signal MEMREQ+ going high sets the cycle request flop 511 of system bus control 219 to request a bus 5 cycle. The acknowledge response from main memory 3, logic signal BSACKR going high sets flop 504 whose Q output BLOCKF+ inputs the AOR and RAF control 235 which is described supra.

If there is a "hit" during the first memory request cycle, the logic signal NO HIT+ input to inverter 525 is low, setting the logic signal CAHIT input to NOR 526 high setting the input to NOR 528 low, setting the D input to flop 529 high. FEMPTY+30 is high since FIFO 203 is empty. On the rise of timing signal CLOCKO+ flop 529 sets and the Q output logic signal CYCADN+ goes high forcing the output of inverter logic signal CYCADN− low which signals CPU2 that the requested data is available. Logic signal CYCADN+ is inverted by inverter 530, delayed 25 ns. by delay line 531 and resets flop 529. If there was not a "hit" in the first memory request cycle then during the cycle that sends the PRA data word from main memory 3 to cache 1 over bus 5, CYCADN+ is again set high as follows. The Read Address Multiplexer 233, FIG. 2, output logic signals ADDRWD+OB and ADDRWD+OA are low and are forced high by inverters 523 and 524 which set the output of AND 533 high, setting the output of NOR 527 low, setting the output of NOR 528 high, setting flop 529 as before. At this time FIFO 203 is not empty, and CYREAD is high at this time.

Flops 508 and 509 are configured as a counter. For an interleaved memory, logic signal MYACKD goes high during each bus 5 cycle where the data word is sent from main memory 3 to cache 1 over bus 5 in response to a CPU2 request. Logic signal BSDBPL goes low for the 2nd word of the 2 word response or if only one word is sent from main memory 3 to cache 1 over bus 5. This happens when the word is in the high order address of a memory bank of main memory 3 to a memory request. This sets the output of NAND 506 low, forcing the output of OR 507 logic signal DATACK− low setting flop 508 in response to the 2nd word received from main memory 3. DATACK− goes low for the 4th word since MYACKD and BSDBPL− are again high setting flop 509 since the SET input logic signal DATCTO is high. The Q output of flop 509, logic signal DATCTI, going high sets the output of NAND 510, logic signal MEMREQ RESET low, resetting flop 503. Flop 503 was held set through the logic signal MEMREQ− input to NOR 502 set low. This kept the SET input of flop 503 high at every rise of CLOCKO+. If the main memory 3 response to the 2nd memory request was logic signal BSWAIT high then the output of NAND 505 goes low forcing DATACK−, the output of OR 507 low thereby setting flop 508. Since the 2-nd memory request is aborted if the main memory 3 response is BSWAIT, the Data Counter flop 508 must be set since only 2 data words will be received from main memory 3. For the banked memory, the input to inverter 537, logic signal BANKED- +OO, is high setting the output low which sets the PRESET input of flop 508 low setting the Q output, logic signal DATCTO, high. Since the banked memory system only makes one memory request and cache 1 received 2 data words in response, the 2nd data word in response will set flop 509 as above and reset flop 503. Logic signal MEMREQ+ going low resets flops 504, 508 and 509.

DETAILED DESCRIPTION OF SYSTEM BUS CONTROL 219—FIG. 5, Sheets 3 & 4

Logic signals BSAD 08−15−, 16+ and 17− connect between the receiver 213 output and an AND 546 whose output logic signal MYCHAN, connects to the SET input of flop 516. BSMREF+ connects between receiver 217 and inverter 547 whose output BSMREF− connects to the AND 546 input. Logic signal BSDCNN+ connects between the receiver 217 cycle control 232, a delay line 522 input, and one input of an OR 521. The output of delay line 522 connects to the other input of OR 521 whose output logic signal BSDCNB+ connects to AOR and RAF control 235 and to the RESET terminal of flops 514, 516, 536, 574 and AOR and RAF control 235. The utput of delay line 522, logic signal BSDCND+, also connects to the CLK terminals of flops 516 and 536 and 574. Logic signal MYACKR connects between the Q output of flop 516 and the input terminals of delay lines 517, 518, AOR and RAF control 235, FIFO R/W control 230 and driver 218. The output of delay line 517 connects to an input of AND 520 whose output logic signal MYACKD connects to AOR and RAF 235 and to an input of NAND 506 in cycle control 232. The output of delay line 518 connects to an inverter 519 input whose output connects to the other input of AND 520. Logic "1" signal connects to the SET input of flop 536 whose $\bar{Q}$ output, logic signal BSDCND−, connects to an input of NAND 535 in cycle control 232. Logic "1" signal connects to the PRESET and D inputs of flop 511. The Q output of flop 511 logic signal CYREQ+ connects to an input of NAND 513. Logic signal BSBUSY− connects between an output of NOR 540 and the other input of NAND 513 whose output logic signal SETREQ− connects to a PRESET input of flop 515. Logic "1" signal connects to a PRESET input of flop 514. Logic signal BSDCND+ connects to the D input and the RESET input. MYDCNN− connects between a $\bar{Q}$ output of flop 541, the CLK input of flop 514 and the enabling inputs of drivers 212, 214 and 218. The Q output of flop 514 logic signal MYREQR+ connects the CLK input of flop 515. The CLEAR− logic signal connects to the RESET input of flop 515. Logic signals BSWAIT and BLOCKF− connect to inputs of AND 512 whose output logic signal MYREQ+ connects to the D input of flop 515 whose Q output logic signal MYREQT connects to Driver 218 and an input to AND 542. BSDCNB+ connects to an inverter 544 input whose output connects to the input of AND 542 whose output, logic signal SETDCN− connects to the PRESET input of flop 541. Logic signals BSACKR and BSWAIT connect between inputs of NOR 543 and Receiver 217. The NOR 543 output connects to the RESET input of flop 541. CLEAR connects between an inverter 573 output and to the input of NOR 543. CLEAR− connects between an input of inverter 573 and receiver 218. BSDCNB− connects between the output of inverter 544 and an input of AND 538. BSREQT+ connects between the input of AND 538 and Receiver 217 and CLEAR connects to the input of AND 538 whose output connects to the input of delay line 539 and an input of NOR 540. The output of delay line 539 connects to the other input of NOR 540. The Q output of flop 541, logic signal MYDCNN+ connects to driver 218 and the input of NAND 535 in cycle control 232. The output of NOR 536, logic signal BSDCNB− connects to the input of NAND 535. Priority logic signals BSAUOK---BSIUOK connect between AND 542 inputs and receiver 217.

Logic signals MEMREQ+ and CLRREQ-OA connect between cycle control 232 and the CLK and RESET inputs respectively of flop 511. Logic signal BSDBPL+ connects between the SET input of flop 574 and receiver 217. The $\bar{Q}$ output of flop 574 connects to cycle control 232.

During the first memory request cycle, if the CPU2 requested data is not in cache 1 then the MEMREQ+ CLK input to flop 511 goes high setting the Q output, logic signal CYREQ+, the input to NAND 513 high. The logic signal BSBUSY− is high if the bus 5 is not busy and the output of NAND 513, logic signal SETREQ− goes low setting flop 515 whose Q output MYREQT goes high and inputs AND 542 requesting a bus 5 cycle. If bus 5 does not have a high priority request the logic signals BSAUOK through BSIUOK are high, and if bus 5 is not transferring information then logic signal BCDCNB− is high and the logic signal SETDCN− output of AND 542 goes low setting flop 541 and the Q output MYDCNN+ goes high gating drivers 212, 214 and 218 putting out on bus 5 information in the format 86 of FIG. 8. When main memory 3 receives the bus 5 information, the acknowledge logic signal BSACKR is sent back to cache 1 over bus 5 and reset flop 541 by setting the NOR 543 output low. The Q output, logic signal MYDCNN−, going high sets flop 514 whose Q output logic signal MYREQR+ high, resets flop 515 since the D input logic signal MYREQ is low. This sets the Q output logic signal MYREQT low. A BSWAIT signal returned by main memory 3 indicating that main memory 3 is busy, resets flops 541 since the output of NAND 543 goes low. However, since the output of AND 512 is high when flop 514 sets and its Q output logic signal MYREQR+ goes high, the Q output of flop 515, logic signal MYREQT remains high and the first memory request is repeated.

In the interleaved mode when main memory 3 acknowledges the first memory request by sending the BSACKR logic signal, flop 511 remains set with the Q output logic signal CYREQ+ high to start the second memory request cycle. Flop 511 remains set during the interleaved mode since the output of NAND 535 remains high as does the CLK input MEMREQ+. The CLRREQ+OB input to NAND 535 is low as long as BLOCKF− input to NOR 536 is high. Logic signal BLOCKF− goes low after the first BSACKR acknowledge. When MYDCNN+ goes high during the second memory request cycle flop 511 is reset since BLOCKF− is low.

However, if the system is in the banked mode flop 511 is reset since the output of NAND 535 in cycle control 232 goes low at the end of the first memory request cycle. Logic signal CLRREQ+OB, the input to NAND 535 is high forcing the output of NAND 535, logic signal CLRREQ-OA low when MYDCNN+ goes high. A second memory request cycle starts when logic signal BSREQT the input to AND 538 goes low when there is no request being made of bus 5 and the output of AND 538 goes low forcing the NOR 540 input low. 20 ns. later the other input to NOR 540 goes low forcing the output logic signal BSBUSY− high. Note that CLEAR is normally high and goes low during system initialization to reset functions. With both inputs to NAND 513 high, the output, logic signal SETREQ− going low again sets the Q output of flop 515 logic signal MYREQT high which requests a bus 5 cycle. Again the output of NAND 542 logic signal SETDCN− goes low setting flop 541 whose Q output logic signal MYDCNN+ goes high gating drivers 212, 214 and 218 to send out the second memory request in the format 8b of FIG. 8 over bus 5 to main memory 3. If main memory 3 sends back the acknowledge logic signal BSACKR flop 541 is reset as before which sets flop 514 which resets flop 515 setting the Q output logic signal MYREQT low. Logic signal MYDCNN+ the input to NAND 535 going high sets the RESET input to flop 511 low setting the Q output logic signal CYREQ+ low thereby preventing subsequent memory request bus 5 cycles. Logic signal CLEAR the input to NOR 543 also resets flop 541.

If main memory 3 were busy and sent back a BSWAIT logic signal in response to the second memory response, flop 541 resets since logic signal BSWAIT going high forces the NOR 543 output low, and the Q output of flop 541, logic signal MYDCNN− goes high setting flop 514 whose Q output logic signal MYREQR goes high. The D input to flop 515 is low since logic signal BLOCKF− is low at this time, forcing the output of AND 512 low. When logic signal MYREQR+ goes high flop 515 resets setting the Q output logic signal MYREQT low. Since flop 511 was reset during the second memory request cycle as before the second memory request is aborted.

The flops 503, 504, 511, 514, 515, 529 and 541 are 74S74 circuits described on page 5-22 of the aforementioned TTL Data Book. Flops 508 and 509 are 74S112 logic circuits described on page 5-34 and flops 516, 536 and 574 are 74S175 logic circuits described on page 5-46 of the aforementioned TTL Data Book.

Main memory 3 sends the logic signals BSDCNN+ and the information in the format 8c of FIG. 8 out on bus 5 to receivers 213, 215 and 217 and the information is strobed into FIFO 203. BSAD 08-17 input AND 546 along with logic signal BSMREF− which was inverted by inverter 547. If the cache 1 identification is 0002$_8$, that is BSAD16+ is high and BSAD 00-15 and 17− are high and that is not a main memory 3 write, i.e. BSMREF− is high, then the output of AND 546 logic signal MYCHAN goes high. Logic signal BSDCNN+ high sets the output of OR 521, logic signal BSDCNB+, high which sets the RESET input of flop 516 high. Logic signal BSDCNN+ is delayed 60 ns. by delay lines 522 and sets flop 516 whose output logic signal MYACKR going high advances the FIFO Write Address Counter flops 320 and 321, FIG. 3. This operation was described supra. Logic signal MYACKR high sets flops 305, FIG. 3, and the Q output logic signal INTERG+ going high gates the data through buffer bypass drivers 205, FIG. 2, to junction 216 since this first data word from main memory 3 is in response to the CPU2 request. Logic signal MYRACKR also goes out on bus 5 to acknowledge to main memory 3 that cache 1 received the information sent out by main memory 3 addressed to cache 1. In FIG. 5, logic signal MYACKR is delayed 20 ns. by delay line 517 and inputs AND 520 whose output, logic signal MYACKD goes high 20 ns. after the rise of MYACKR. Logic signal MYACKR is delayed 40 ns. by delay line 518, is inverted by inverter 519 and sets the other input of AND 520 low. Logic signal MYACKD is a positive going 20 ns. pulse delayed 20 ns. from the rise of MYACKR. Logic signal MYACKD delays the setting of the Function Code History flops 412 and 413, FIG. 4, until after the data received from bus 5 is set into FIFO 203.

The above sequence is repeated in the interleaved mode for the 4 cycles in which the data words are transferred from main memory 3 to cache 1 in response to the first and second memory requests. In the banked mode the sequence is repeated for 2 cycles in response to the one memory request.

SYSTEM BUS 5 FORMATS

Format 8a of FIG. 8 shows the system bus 5 formats processed by cache 1 and/or main memory 3. FIG. 8a shows the memory address field with an 18 bit main memory 3 word address BSAD 05-22 of a 20 bit data word BSDT 00-15, A, B, DSDP 00, 08. This format is used by CPU2 to updata main memory 3 over system bus 5. Cache 1 reads the address and data in FIFO 203 from bus 5 through receivers 213, 215 and 217. Cache 1 senses that logic signal BSMREF is high, indicating that the address field contains a main memory 3 address, senses that BSWRIT is high indicating this is a write operation, and checks if the address location is written into cache 1. If the address is found in directory 202, FIG. 2, then the data word stored in data store 201 is updated. If the address is not in the directory 202, then the data is discarded. A peripheral controller may send a 9 bit byte main memory 3 address BSAD 05-23. In that case, cache 1 would update byte 0 or byte 1 if either byte is stored in the data buffer 201.

Format 8b of FIG. 8 shows the main memory 3 request sent from cache 1 to main memory 3. The address field contains the main memory 3 word address BSAD 05-22. The data field contains the 12 bit cache 1 identification code 0002$_8$, BSDT A, B, 00-09 and the 6 bit function code 00$_8$ or 01$_8$. A function code of 00$_8$ designates the bus cycle as the first memory request cycle. The function code of 01$_8$ designates the bus 5 cycle as the second memory request cycle. BSMREF is high since this is a request of main memory 3.

Format 8c of FIG. 8 shows the main memory 3 responce format to the memory read request of format FIG. 8b. The address field contains the destination number of cache 1, 0002$_8$ and the function code 00$_8$, indicating a response to a first memory request or the function code 01$_8$ indicating a response to a second memory request, BSWAIT+ indicates that main memory 3 is requesting cache 1 to write the data word in cache 1 at the address indicated by the format 8b of FIG. 8 main memory 3 read request. BSSHBC high indicates that this is in response to a memory request. An interleaved memory main memory 3 request in the format 8b of FIG. 8 contains PRA for the first request address and PRA+1 for the 2nd request address. Main memory 3 responds with the PRA and PRA+2 data words in response to the first request and the PRA+1 and PRA+3 data words in response to the 2nd request.

A banked memory main memory 3 request in the format 8b of FIG. 8 contains PRA. Main memory 3 responds with the PRA and PRA+1 data words.

MAIN MEMORY 3—DATA BUFFER 201 DIRECTORY 202 RELATIONSHIPS

Figure 10:
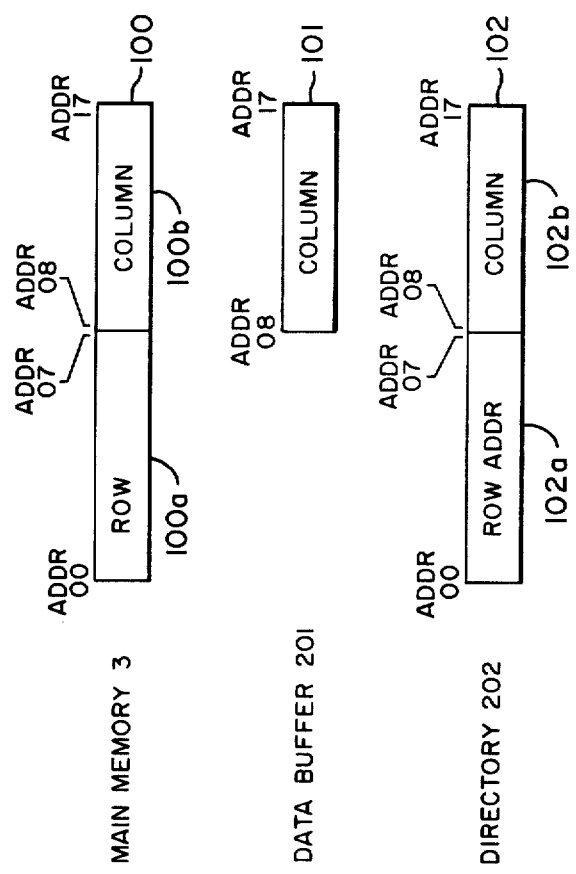
FIG. 10 shows the layout of the address bits for main memory and cache.

FIG. 10 illustrates the relationships of the 18 bit address ADDR 00-17 in main memory 3, data buffer 201 and directory 202.

The 262,143 word locations in main memory are addressed by the 18 bit, ADDR 00-17 100 address which is made up of a row address portion ADDR 00-07 100a and a column address portion ADDR 07-17 100b. Main memory 3 may therefore be considered as organized into 1,024 columns and 256 rows.

Figure 11:
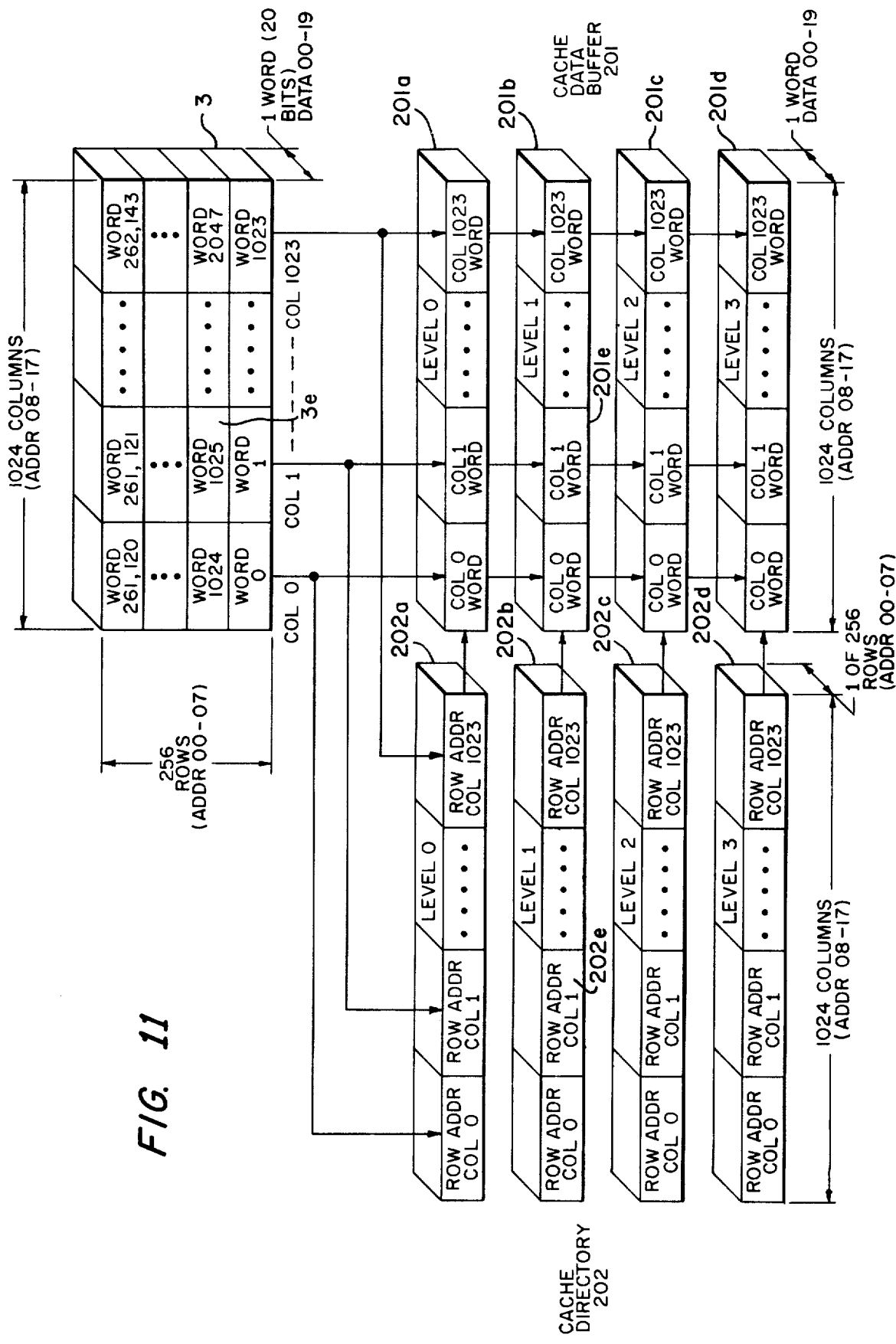
FIG. 11 illustrates the relationship between a banked main memory and cache; and,
FIG. 12 illustrates the relationship between an interleaved main memory and cache.

The data buffer 201, FIG. 11, has 4 levels, LEVEL 0-3 201a–d. The column address ADDR 08-17 101, FIG. 10, locates 4 words one from each level of data buffer 201. The directory 202, FIG. 11, also has 4 levels, LEVEL 0-3 202a–d and the 18 bit address ADDR 00-17 102 FIG. 10, is made up of a column address ADDR 08-17 102b and a row address ADDR 00-07 102a. Row addresses ADDR 00-07 102a are stored in column address ADDR 08-17 102b locations of directory 202.

FIG. 11 shows the relationships between data buffer 201, directory 202 and main memory 3 where main memory 3 is organized in a banked configuration. In the banked configuration the data words are stored in successive address locations. This is in contrast to the interleaved configuration in FIG. 12 where data words in even address locations (ADDR 17 is a "0") are in one memory 3 bank and data words in odd address locations (ADDR 17 is a "1") are in the adjacent memory 3 bank.

Data buffer 201 comprises 4 levels, LEVEL 0-3 201a–d, each level having 1,024 data word address locations. Directory 202 comprises 4 levels, LEVEL 0-3 202a–d, each level storing 1,024 row addresses. For each data word location in data buffer 207 there is a corresponding location in directory 202 that stores a row address. The combination of column address and row address identifies the data word in data buffer 201 and main memory 3.

The example below will show the relationship between the main memory 3, data buffer 201 and directory 202. Assume the 20 bit data word in main memory address location 1025 is to be stored in level 1 of data buffer 201. Selection of levels is described in copending related application 2 described supra.

The data word DATA00-19 in address location 1025 has the value of ADDR 00-17 as $002001_8$. The column address ADDR 08-17 has a value of $0001_8$. The row address ADDR 00-07 has a value of $001_8$. The data word is written into the LEVEL 1 201e location identified by column address $0001_8$ of data buffer 201. The row address $001_8$ is written into LEVEL 1 202e location identified by column address $0001_8$.

Figure 12:
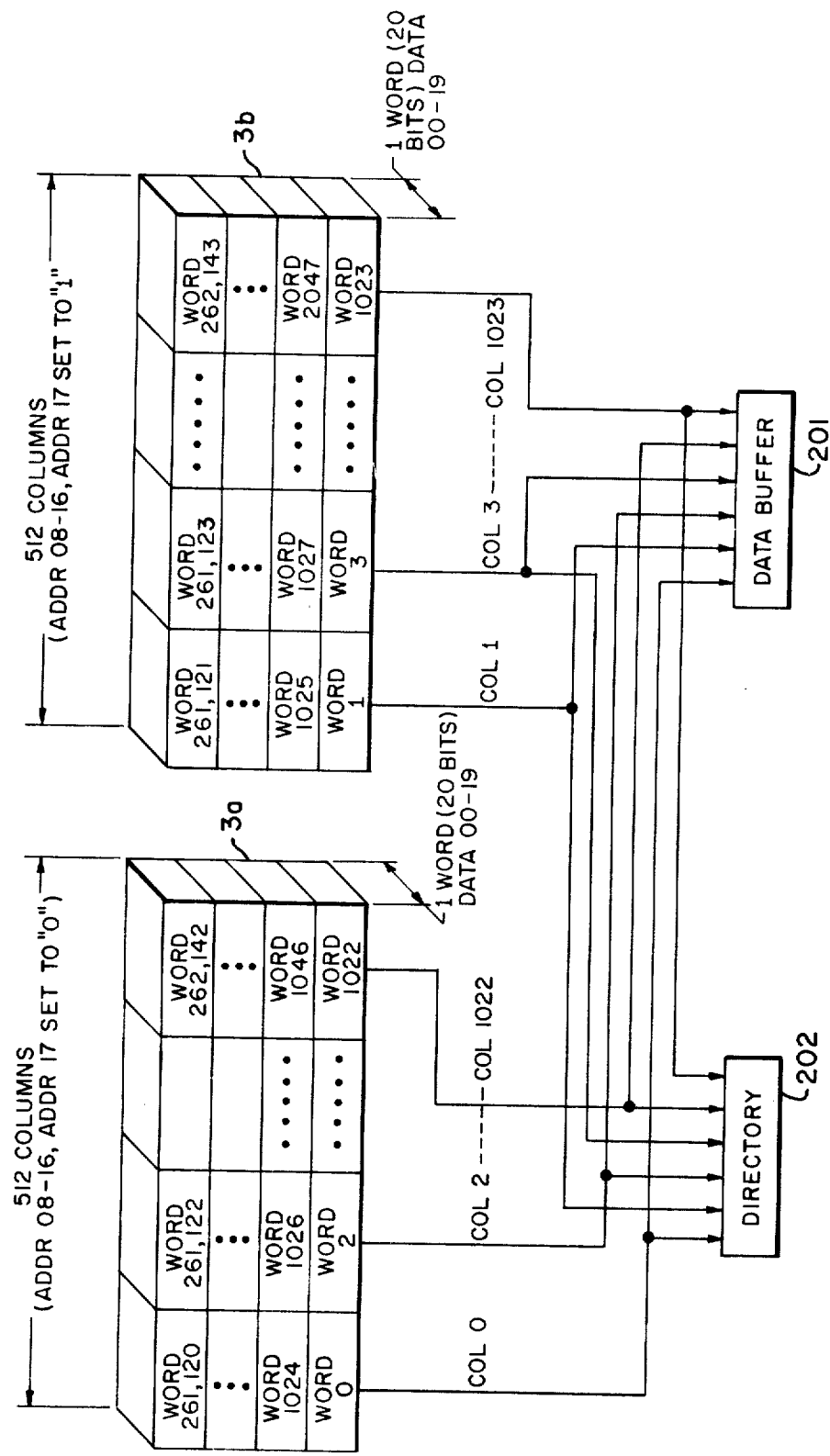

FIG. 12 illustrates the interleaved main memory 3 with all the even address locations, address bit ADDR 17 set to "0", in memory bank 3a and all the odd address locations, address bit ADDR 17 set to "1", in memory bank 3b. In FIGS. 11 and 12 the lines designated Col 1 through Col 1023 are not actual connections but rather indicate that a data word in a particular column of main memory 3 will be written into that column of data buffer 201 and the row address will be written into that column of directory 202.

DESCRIPTION OF OPERATION

FIG. 9 is a flow chart illustrating the sequence of operations that start when CPU2 makes a request of cache 1 for a data word.

The sequence starts in Block 901. CPU2 forces signal CACHRQ high which sets flop 313 FIG. 3 forcing the Q output signal FEMPTY-20 low. Signal FEMPTY-20 low starts CLOCK0+ to cycle and sets the RAF 206 read address counter flops 426 and 427 FIG. 4, to location 00. CPU2 sends the request address (PRA) signals BAOR 05-22+ through the 2:1 MUX 208, which is enabled by signal ADDRSO+, to directory 202 FIG. 2 to perform the search.

The directory search is made in block 902 and PRA is loaded into AOR 207 and RAF 206 location 00 through 2:1 MUX 209. Signal FEMPTY-20 forces signal AORCNT, the output of NOR 419 FIG. 4 high which enables signal BAWRIT, the RAF 206 write strobe, enables signal BAORCK, the AOR 207 write strobe. and advances the RAF 206 Write Address Counter flops 426 and 427 to location 01.

In block 903 the rise of CLOCK0+ sets flop 301 FIG. 3 whose $\overline{Q}$ output signal BLKREQ— resets flop 313. The Q output signal FEMPTY-20 is forced high keeping CLOCK0+ high.

If in block 904 PRA was found in directory 202 FIG. 2, then in block 905 the data word in the corresponding data buffer 201 address location, signals CADP 00-19 are sent to CPU2. Also a directory "hit" results in the setting of flop 529 FIG. 5 whose Q output is inverted and sent to CPU2 as signal CYCADN— where it strobes the data word into a register (not shown) and forces signal CACHRQ low.

If in block 904 PRA is not stored in directory 202 FIG. 2 then in block 906 flop 503 FIG. 5 sets and the Q output signal MEMREQ+ sets flops 511 whose Q output signal CYREQ+ goes high. Also, PRA+1 appears at the output of ADDER 211 when RAF 206 write address counter is set to location 01.

Cache 1 now requests bus 5 to send the memory request to main memory 3 for 2 data words if main memory 3 is banked. Or if main memory 3 is interleaved 2 memory requests are sent by cache 1 for 4 data words from main memory 3.

Cache 1 requests access to bus 5 by forcing signal CYREQ+ the Q output of flop 511 high, FIG. 5. In block 907 when bus 5 is not busy the 2 signal inputs to NAND 513, FIG. 5, BSBUSY— and CYREQ+ which in block 908 sets flop 515. The Q output signal MYREQT remains high in block 909 until cache 1 has the highest priority of the system units requesting access to bus 5 then in block 910 the output of AND 542 goes low and sets flop 541. The Q output signal MYDCNN+ going high gates drivers 212, 214 and 218 to send out on bus 5 information in the format of FIG. 8b. PRA, cache identification $0002_8$, Function Code $00_8$ indicates that this is the first request of main memory 3, BSMREF high. This indicates that the address levels BSAD 05-22 contain a main memory 3 address and BSDBPL high and indicates that 2 data words are requested from main memory 3. Main memory 3 responds in block 912. If main memory 3 is busy and cannot accept the bus 5 cycle in block 913a flop 541 the MYDCNN flop is reset, however, flop 515 remains set and signal MYREQT high requests another bus 5 cycle. When the response is an acknowledge and signal BSACKR goes high flops 515 and 541 are reset in block 913. Also flop 511 resets in the banked memory operation. Flop 504 sets in block 914 and the Q output logic signal BLOCKF+ goes high.

FIG. 6 is a timing chart illustrating the relative sequencing of the interleaved memory operation. In the first memory request cycle timing signal CACHRQ 601 going high starts the cycle, causing FEMPTY-20 602 to go low. FEMPTY-20 going low forces BAWRIT 604 and BAORCK 605 low to strobe PRA into RAF 206 and AOR 207 respectively; and also advances the RAF 206 write address counter 234 by forcing AORCNT-30 609 low. If there is a directory "hit" HIT 0-3 606 goes high in the middle of the cycle (dotted line) and the data word CADP 00-19 607 (dotted line) is sent to CPU2. CYCADN− 608 is sent to CPU2 and forces CACHRQ 601 low (dotted line). If there is no "hit" MEMREQ 610 is set high by the rise of CLOCK0+ 603 which sets MYREQT 612 high. MYREQT 612 in turn sets MYDCNN+ 613 high. The BSACKR 614 response resets MYDCNN 613 which resets MYREQT 612. BSACKR 612 sets BLOCKF 611 high to start the second memory request.

FIG. 7 is a timing chart illustrating the relative sequencing of the banked memory operation. The timing signals of the memory request cycle of FIG. 7 are the same as the corresponding timing signals of FIG. 6.

With BLOCKF high in block 915, signal BAWRIT strobes PRA+1 into RAF 206 location 01. Signal BAORCK strobes PRA+1 into AOR 207 and the write address counter 234 is advanced to location 02. PRA+1 is switched from the ADDER 211 output through 2:1 MUX 209 which is enabled by signal MEMREQ, FIG. 2.

For the interleaved memory block 916 advances to block 917 whereas for the banked memory block 925 is processed next. For the interleaved memory blocks 917 through 920 is a repeat of blocks 907 through 910. In block 921 signal MYDCNN+ is set and strobes drivers 212, 214 and 215, FIG. 2, sending out on bus 5, PRA+1, Cache Identification $0002_8$, Function $01_8$ designating this as the second memory cycle, BSMREF and BSDBPL as before.

This time the main memory 3 is busy and responds in block 922 with signal BSWAIT. In block 923 the data counter by setting flop 508, FIG. 5. Now in block 924, signals BSACKR and BSWAIT reset MYDCNN, MYDCNN+ and CYREQ.

BLOCKF 611, FIG. 6, starts the second memory request cycle by going high thereby forcing BAWRIT 604 low to strobe PRA+1 into location 01 of RAF 206 and forcing BAORCK 605 low to strobe PRA+1 into AOR 207. Signal AORCNT-30 609 advances RAF 206 write address counter 234 to location 02.

MYREQT 612, MYDCNN 613 and BSACKR 614 cycle as before. BSWAIT 615 resets MYREQT 612 and MYDCNN 613 and forces DATACK 616 low (dotted).

Both the Banked and interleaved operations now await the bus 5 cycle which sends the PRA data word from main memory 3 to cache 1 in response to the first memory request.

When information is being transferred on bus 5, signal BSDCNN+ goes high in Block 925 forcing the output of NAND 332, FIG. 3, the write enable signal FWRITE low. This signal transfers the information on bus 5 through receivers 213, 215 and 217, FIG. 2, into FIFO 203.

For both interleaved and banked memories the flow diagram of FIG. 9 makes a number of passes from block 926 through 950; that is one pass for each data word transfer from main memory 3 to cache 1 over bus 5 in response to the memory request.

The information received in block 926 by FIFO 203 must be in the format of FIG. 8c if it is a response to the memory request. If it is not in that format then cache 1 performs a different sequence of operations described in copending related application 1 described supra. Assuming the information received is in response to the memory request, then the PRA data word is received by cache 1 on the first bus 5 data cycle as is the cache identification $0002_8$, function code $00_8$ indicating that this is in response to the first memory request, BSDBPL high indicating that this is the first of the 2 data words in response to the first memory request, BSMREF low indicating that the address field contains the cache identification and function code and BSSHBC high indicating that this bus cycle is in response to the memory request.

For the banked memory the PRA and PRA+1 data words are received in response to the memory request. BSDBPL will be low for the PRA+1 data word. The function code will be $00_8$ for both the PRA and PRA+1 data words.

For the interleaved memory the PRA and PRA+2 data words will be sent from main memory 3 to cache 1 over bus 5 with a function code of $00_8$ indicating this is the response to the first memory request, PRA+1 and PRA+3 will be sent with a function code of $01_8$ indicating this is a response to the second memory cycle, BSDBPL will high for PRA and PRA+1 and low for PRA+2 and PRA+3.

If the cache identification is $0002_8$ then in block 927 signal MYCHAN is forced high as the output of AND 546, FIG. 5, and sets flop 516 whose Q output MYACKR going high sends a signal back to main memory 3 acknowledging that the information was received in response to the memory request. The signal is received by main memory 3 as BSACKR.

If in block 926 the data word received by FIFO 203 is not in response to the memory request, then in block 927, signal MYCHAN does not go high and the decision block 927a exits to a series of decision blocks 927b, 927c and 927d which test if the information in FIFO 203 is an acknowledged main memory 3 write operation. If it is a write, BSWRIT is high, and if it is addressed to main memory 3, BSMREF is high and if main memory 3 acknowledged the receiving of the information, BSACKR is high. Then in block 932a, the FIFO 203 Write Address Counter is incremented by +1.

For the interleaved memory, decision block 929 tests the RAF 206 write address counter 234. If set at location 02 then in block 930 the ADDER 211 input control signal +1, the output of EXCLUSIVE OR 237 FIG. 2 is high and PRA+2 appears at the output of ADDER 211 and is strobed into RAF 206 location 02. The write address counter 234 is then advanced to location 03. If the write address counter 234 had been set to location 03 then the +2 control signal, the output of AND 236 is high and PRA+3 appears at the output of ADDER 211 and is strobed into RAF 206 location 03 after which the write address counter 234 advances to location 00.

Both banked and interleaved memory systems in block 932 advance the FIFO 203 write address counter flops 320 and 321 FIG. 3 by forcing signal FPLUS1 low. Advancing the write address counter flops forces the output signal FEMPTY+ of comparator 318 low. This signal is inverted and sets flops 313 so that the Q output signal FEMPTY +20 goes low and starts CLOCK0+ cycling in block 933.

Decision block 934 now tests the function code low order bit BSAD23. If BSAD23 is low indicating this is the response to the first memory request then in block 935 the FCHZRO flop 413 FIG. 4 sets and if BSAD23 is high the FCHONE flop 412 of block 936 sets. Flops 412 and 413 condition the read address multiplexer 233 outputs to select the address stored in RAF 206 with the proper PRA data word received from main memory 3 in response to the memory request.

Decision block 937 tests signal BSDBPL which when low indicates the second word of a memory response and advances the block 933 data counter flops 508 and 509 FIG. 5.

Decision block 939 tests for the end of the bus 5 cycle and when signal BSDCNN+ goes low, flop 516 FIG. 5 sets in block 940 and the Q output signal MYACKR goes low.

The first bus 5 information stored in FIFO 203 is read in block 941 and if the FIFO bit position 41+ is low in decision block 942 it indicates that this is update information. The update operation is disclosed in related copending application 3 described supra. If the FIFO bit position 41+ is high indicating that this is a replacement operation then the read address multiplexer 233, FIG. 2, selects the proper operation in RAF 206 to read out the address corresponding to the data word in FIFO 203 into LR 204. On the CLOCK0+ rise flop 323, FIG. 3, sets the Q output CYFIFO high which enables LR 204. This sets the output of the selected location of RAF 206 indicated by read address multiplexer 233 into the address flops of LR 204 and also sets the data output and control output of FIFO 203 into the respective flops of LR 204.

Decision block 945 tests the output of the read address multiplexers 414 and 415, FIG. 4, and if set to location 00, sets flops 529, FIG. 5, in block 946 which results in signal CYCADN— being sent to CPU2 as before. Also flop 305, FIG. 3 is set and the Q output signal INTERG+ gates the data word from signal lines FIFO 19-38 through the buffer bypass drivers 205, FIG. 2, to CPU2 as CADP00-19. CPU2 then resets signal CACHRQ which resets flop 301, FIG. 3, which resets flop 305. If this is not the first data word cycle then the read address multiplexers 233 are not set to location 00 and in block 947 a directory 202 search is made. If the data word is already in the data buffer 201 then no further action is taken on the data word. If the data word is not in data buffer 201 then in block 948, the round robin logic unit 224 selects the WRITE signal of the next level of that column address into which the data word is to be written. In block 949 the data word is written into the data buffer 201, the row address is written into the directory 202 and the old level of round robin 224 is incremented by +1 the address location selected by the column address.

In decision block 950 the data counter flop 509 FIG. 5 if set resets the flops indicated in block 951 and the operation is concluded. If flop 509 is not set then the operation returns to block 925 to await the next data word from main memory 3 in response to the memory request.

Again returning to FIG. 6 for the PRA cycle, that is the cycle in which the first data word is sent from main memory 3 to cache 1 over bus 5 signal, BSDCNN+ 618 goes high indicating that there is a bus 5 cycle starting and forces the FIFO 203 write enable signal FWRITE 619 low. This loads FIFO 203 from receivers 213, 215 and 217 with the information from bus 5. If the information is in response to the memory request then signal MYACKR 620 goes high acknowledging the bus 5 transfer and advancing the FIFO 203 write address counter by forcing FPLUS1 621 low. Advancing the counter indicates that FIFO 203 has information stored in it. This forces FEMPTY+ 20 621 low which starts CLOCK0+0 603 cycling. The data word output of FIFO 203 is sent through the buffer bypass drivers 205 during the time indicated by INTERG 625 as CADP00-19 607. Signal CYCADN— 608 strobes the data word CADP00-19 607 into CPU2 and resets CACHRQ 601.

Signal ADDRSO+ switches 2:1 MUX 208 so that when signal CYFIFO 627 comes high and strobes the outputs of RAF 206 and FIFO 203 into LR 204, the output of LR 204 can start the directory search by transferring the address signals ADDR00-17+ through the switch. Signal REPLACE comes high to switch 2:1 MUX 223 to receive the selected WRITE 629 signal for the directory 202 and data buffer 201 replacement write operation. Signal CYREAD 628 low gates the selected signal WRITE 0-3 629.

Local Register 632 shows information transferring into LR 204 when signal CYFIFO goes high.

Signal BUMPUP 630 advances the read address counter of FIFO 203 by going low. LR 632 is already loaded with the FIFO 203 at this time. The RAF read address multiplexer 631 when high, gates the output of the location indicated by the ADDRWD+0B and ADDRWD+0A signals to LR 204. BAWRIT 604 loads PRA+2 into location 02 and PRA+3 into location 03 on successive MYACKR 620 pulses. AORCNT —30 609 advances the write address counter after each loading of PRA+2 and PRA+3 into RAF 206.

In the PRA+2, PRA+1 and PRA+3 cycles if the data word is stored in data buffer 201 then HIT 0-3 606 will go high (dotted) for that data word, suppressing the fall of CYREAD 628 which in turn suppresses the WRITE 0-3 629 pulse. The data word will therefore not be written into the data buffer 201.

As previously stated, if the response to the second memory request was the BSWAIT signal then the request is not repeated. Since 2 data words instead of 4 data words will be sent from main memory 3 to cache 1 over bus 5 the data counter is incremented when signal DATACK 616 pulses (dotted) in the second memory request cycle. Then in the PRA+2 cycle when the second data word is sent over bus 5 to cache 1, the signal DATACK 616 again pulses which sets DATCTI high (dotted). This resets MEMREQ 610 (dotted) which resets BLOCKF 611 (dotted) and DATCTI 617 and the prefetch operation is completed.

Normally signal DATACK is pulsed by the second data word and the fourth data word (BSDBPL high) and the operation completed after the fourth data word cycle when signal DATCT1 617 comes high and resets signal MEMREQ 610 which resets BLOCK F 611 and DATCTI 617.

Now returning to FIG. 7 illustrating the timing of the banked main memory 3 and cache 1 operation, in many respects the timing signals of FIG. 6 illustrating the interleaved operation are similar to their respective timing signals in FIG. 7. The basic difference is that FIG. 7 illustrates the banked timing which requires 2 data cycles, the PRA and PRA+1 data cycles compared to FIG. 6 which illustrates the interleaved timing which requires 4 data cycles, PRA, PRA+1, PRA+2 and PRA+3. Therefore many of the FIG. 6 timings show 4 cycles as compared to the FIG. 7 timings which show 2 cycles of operation. Also, since the data counter is forced to +1 in the banked operation only 1 DATACK 716 pulse is needed to set DATCTI 717 which resets MEMREQ 710 which in turn, resets BLOCKF 711 and DATCTI 717 as before.

Having shown and described two embodiments of the invention, those skilled in the art will realize many variations and modifications may be made to produce the described invention and still be within the spirit and scope of the claimed invention.

What is claimed is:

1. A data processing system comprising:
   a system bus;
   a central processing unit coupled to said bus and being operative to generate memory requests, each memory request including a main memory address;
   an addressable main memory coupled to said bus, said main memory including a plurality of sets of locations for storing a plurality of words, each word location being designated by an address coded to include a first portion and a second portion; and,
   a cache unit coupled to said bus and to said central processing unit, said cache unit comprising:
      a register for storing said main memory address received from said central processing unit;
      an addressable data store, said data store having a plurality of locations for storing the contents of subsets of said sets of locations for storing said plurality of words, each word location being designated by said second portion of said address;
      an addressable directory, said directory including a plurality of locations corresponding in number to said plurality of data store locations for storing a plurality of said first portion of said addresses in a location designated by said second portion of said address, each address location of said directory specified by said second portion of said address having a corresponding address location in said data store storing said word specified by said second portion of said address and said first portion of said address stored in said address location of said directory specified by said second portion of said address, said cache unit and said directory receiving said main memory address from said central processing unit when requesting said word from said main memory; and,
      control means coupled to said register and responsive to each memory request received from said central processing unit and coded to specify a read operation for indicating if said word requested by said central processing unit is stored in said data store by comparing said first portion of each main memory address received from said central processing unit with said first portion address stored in the location of said directory read out in response to said second portion of each main memory address received from said central processing unit, and in the absence of said equal comparison requesting said word from said main memory by generating a signal for transferring signals representative of said main memory address to said register and to said main memory, said control means being operative upon receiving said word from main memory to generate signals for writing said word in said data store at the location designated by said second portion of said address stored in said register and for concurrently writing said first portion of said main memory address stored in said register in said directory in said location designated by said second portion of said main memory address.

2. The system of claim 1 wherein said cache unit further includes means for sending said word received from said main memory to said central processing unit during the writing of said word in said data store at said address location specified by said second portion of said main memory address stored in said register.

3. The system as described in claim 2 wherein the presence of the equal comparison as specified by said control means generates signals to transfer said word in said data store location designated by said second portion of said main memory address to said central processing unit.

4. The system as described in claim 3 wherein said data store and said directory each are organized in a plurality of levels of storage locations, each of said levels having locations responsive to said second portion of said main memory address, and each of said locations of said plurality of levels of said data store having corresponding locations of said plurality of levels of said directory.

5. The system as described in claim 4 wherein said main memory addressable locations are organized in a plurality of columns of said address locations, and each of said plurality of columns is organized in a plurality of rows of said address locations, said plurality of columns being addressable by said second portion of said main memory address, and said plurality of rows being addressable by said first portion of said main memory address, said data store storing said word in said location designated by a column address, and said directory storing a row address in said location designated by said column address.

6. The system as described in claim 5 wherein the number of data store word locations is substantially less than the number of said memory word locations.

7. A data processing system comprising:
   an addressable main memory, said main memory including a plurality of sets of locations for storing a plurality of words, each word location being designated having an address, said address being coded to have a first portion and a second portion; and,
   a cache unit coupled to said main memory to store signals read out from said main memory in response to a main memory request including a main memory address, said cache unit further comprising:
      a register for storing said main memory address requested of said cache unit;
      an addressable data store, said data store having a plurality of locations for storing the contents of subsets of said sets of locations for storing said plurality of words, each word location being designated by said second portion of said address;
      an addressable directory, said directory including a plurality of locations corresponding in number to said plurality of data store locations for storing at least a first portion of one of said addresses in a location designated by said second portion of said address each address location of said directory specified by said second portion of said address having a corresponding address location in said data store storing said word specified by said second portion of said address and said first portion of said address stored in said address location of said directory specified by said second portion of said address, said cache unit and said directory receiving said main memory address requested of said main memory; and control means responsive to each memory request specifying a read operation for indicating if a requested word is stored in said data store by comparing said first portion of each main memory address with said first portion address stored in the location of said directory designated by said second portion of said each main memory address, and in the absence of an equal comparison generating signals for transferring signals representative of said main memory address to said register and to said main memory, said control means being operative upon receiving said requested word from said main memory to generate signals for writing said word in said data store at the location designated by said second portion of said address stored in said register and for concurrently writing said first portion of said main memory address stored in said register in said directory in said location designated by said second portion of said main memory address.

8. The system of claim 7 wherein said cache unit further includes means for sending said word received from said main memory to a requesting unit during the writing of said word in said data store at said address location specified by said second portion of said main memory address stored in said register.

9. A system as described in claim 8 wherein the presence of the equal comparison as specified by said control means generates signals to transfer said word in said data store location designated by said second portion of said main memory address to said requesting unit.

10. A system as described in claim 9 wherein said data store and said directory each are organized in a plurality of levels, of storage locations, each of said levels having locations responsive to said second portion of said main memory address, and each of said locations of said plurality of levels of said data store having corresponding locations of said plurality of levels of said directory.

11. A system as described in claim 10 wherein said main memory addressable locations are organized in a plurality of columns of said address locations, and each of said plurality of columns is organized in a plurality of rows of said address locations, said plurality of columns being addressed by said second portion of said main memory address, and said plurality of rows being addressed by said first portion of said main memory address, said data store storing said word in said location designated by a column address, and said directory storing a row address in said location designated by said column address.

* * * * *